United States Patent [19]

Ueda

[11] Patent Number: 5,072,408
[45] Date of Patent: Dec. 10, 1991

[54] MICROFILM HANDLING SYSTEM
[75] Inventor: Nobuo Ueda, Osaka, Japan
[73] Assignee: Minolta Camera Kabushiki Kaisha, Osaka, Japan
[21] Appl. No.: 505,014
[22] Filed: Apr. 4, 1990
[30] Foreign Application Priority Data
  Apr. 7, 1989 [JP] Japan ................................. 1-86871
  Apr. 7, 1989 [JP] Japan ................................. 1-86872
[51] Int. Cl.$^5$ ............................................. G03B 23/14
[52] U.S. Cl. ................................ 395/474.22; 353/25; 353/26 R; 353/26 A
[58] Field of Search ............... 353/271, 64, 26 R, 25, 353/26 A, 27 R, 27 A; 355/40, 41; 358/108; 364/200, 518, 900

[56] References Cited

U.S. PATENT DOCUMENTS

| | | | |
|---|---|---|---|
| 4,494,862 | 1/1985 | Tanaka | 355/40 |
| 4,693,591 | 9/1987 | Saijo et al. | 353/26 R |
| 4,705,391 | 11/1987 | Peeters et al. | 355/40 |
| 4,736,224 | 4/1988 | Watanabe et al. | 355/41 |
| 4,738,523 | 4/1988 | Ito et al. | 353/26 R |
| 4,875,768 | 10/1989 | Hirasawa et al. | 353/27 A |
| 4,908,704 | 3/1990 | Fujioka et al. | 358/108 |

FOREIGN PATENT DOCUMENTS 60-23338 6/1985 Japan .
60-24452 6/1985 Japan .

Primary Examiner—Parshotam S. Lall
Assistant Examiner—Edward R. Cosimano
Attorney, Agent, or Firm—Willian Brinks Olds Hofer Gilson & Lione

[57] ABSTRACT

A reader printer for copying image information from a microfilm having a multiplicity of image frames recorded therein, frame marks for retrieval affixed thereon opposite the image frames, and batch marks for retrieval affixed thereon opposite the leading image frames of batches of image frames. When one of the batches of image frames is designated, the information contained in all the image frames in the batch is recorded sequentially from the last through the first of the image frames. The positioning of each of the image frames included within the designated batch at a prescribed location of the projected light path is accomplished by detecting the frame marks with a sensor, memorizing the positional relationship of the frame marks prior to the operation of print copying, and selectively imparting a motion to the microfilm based on the memorized data of position. The sensor is disposed at a position deflecting from the projected light path. Since the sensor is not affected by the light traveling through the projected light path, the positioning of the image frame at the center of the projected light path is accomplished with high accuracy. When a plurality of copies are to be produced from one image frame, the aforementioned data of positions between the frame marks are renewed each time the production of one copy is completed.

21 Claims, 17 Drawing Sheets

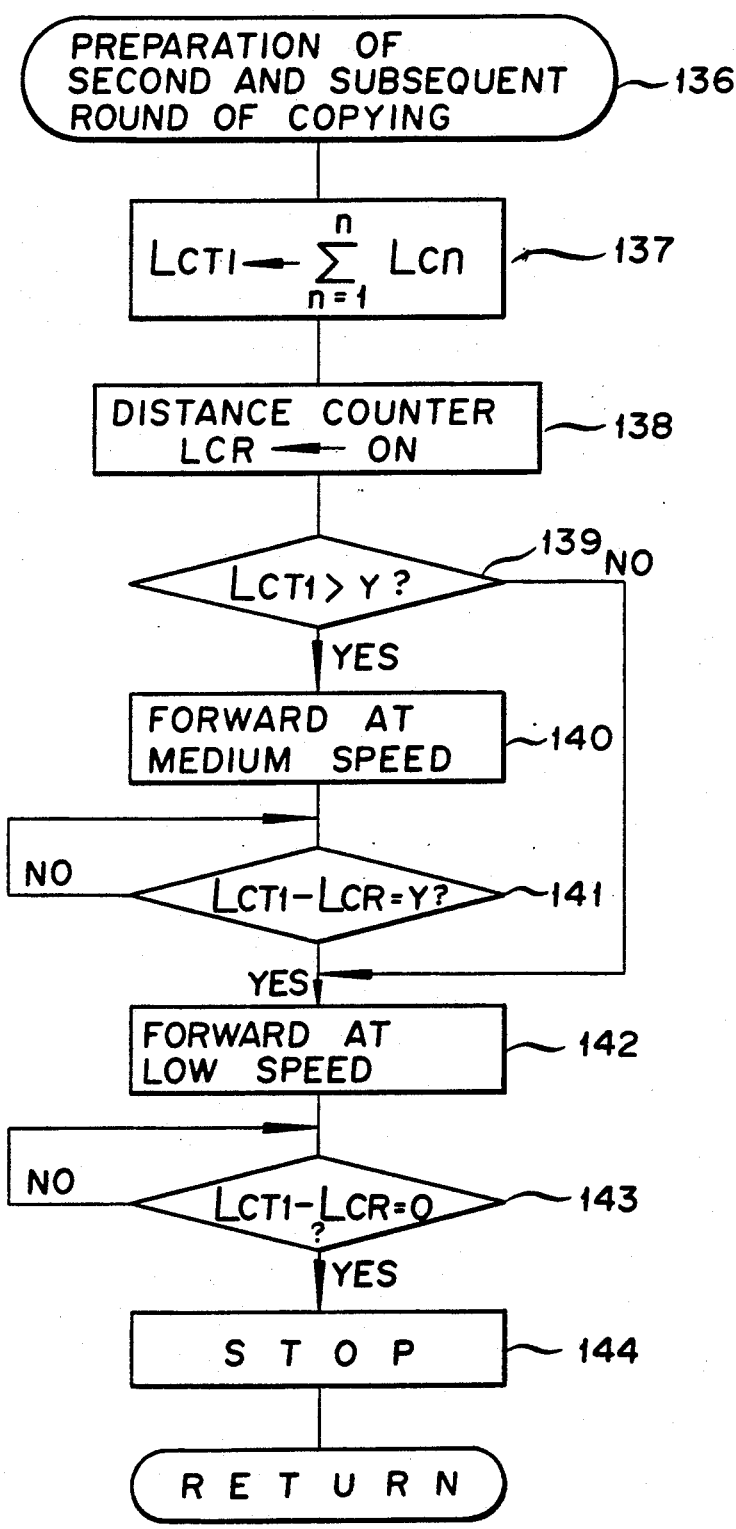

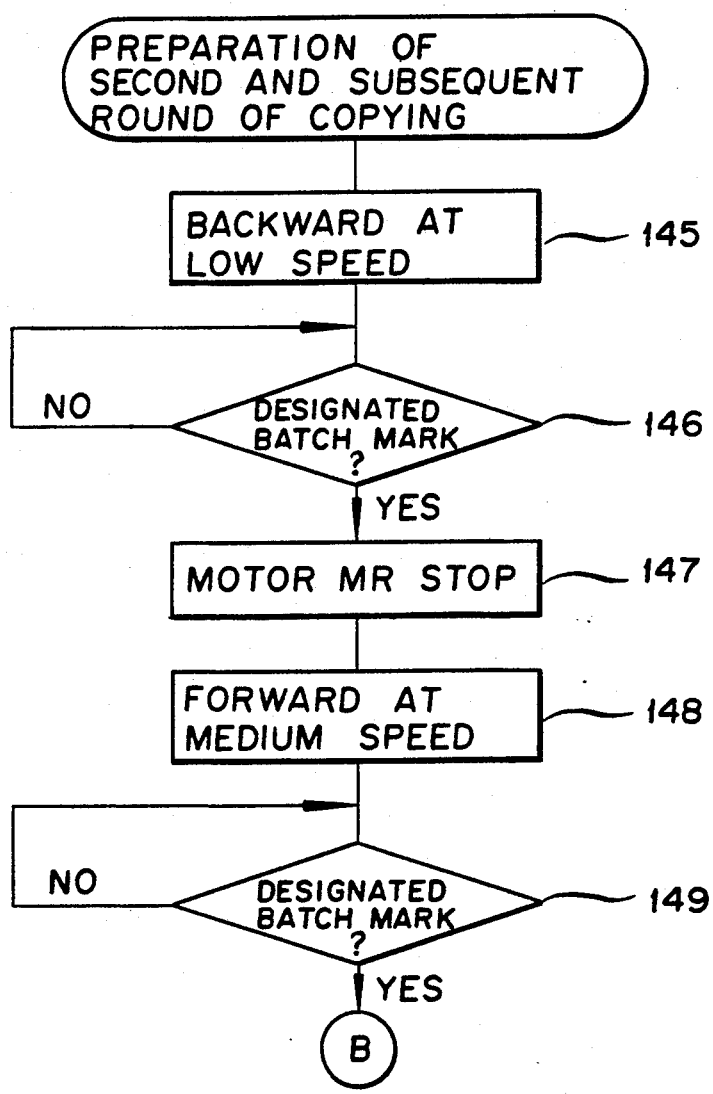

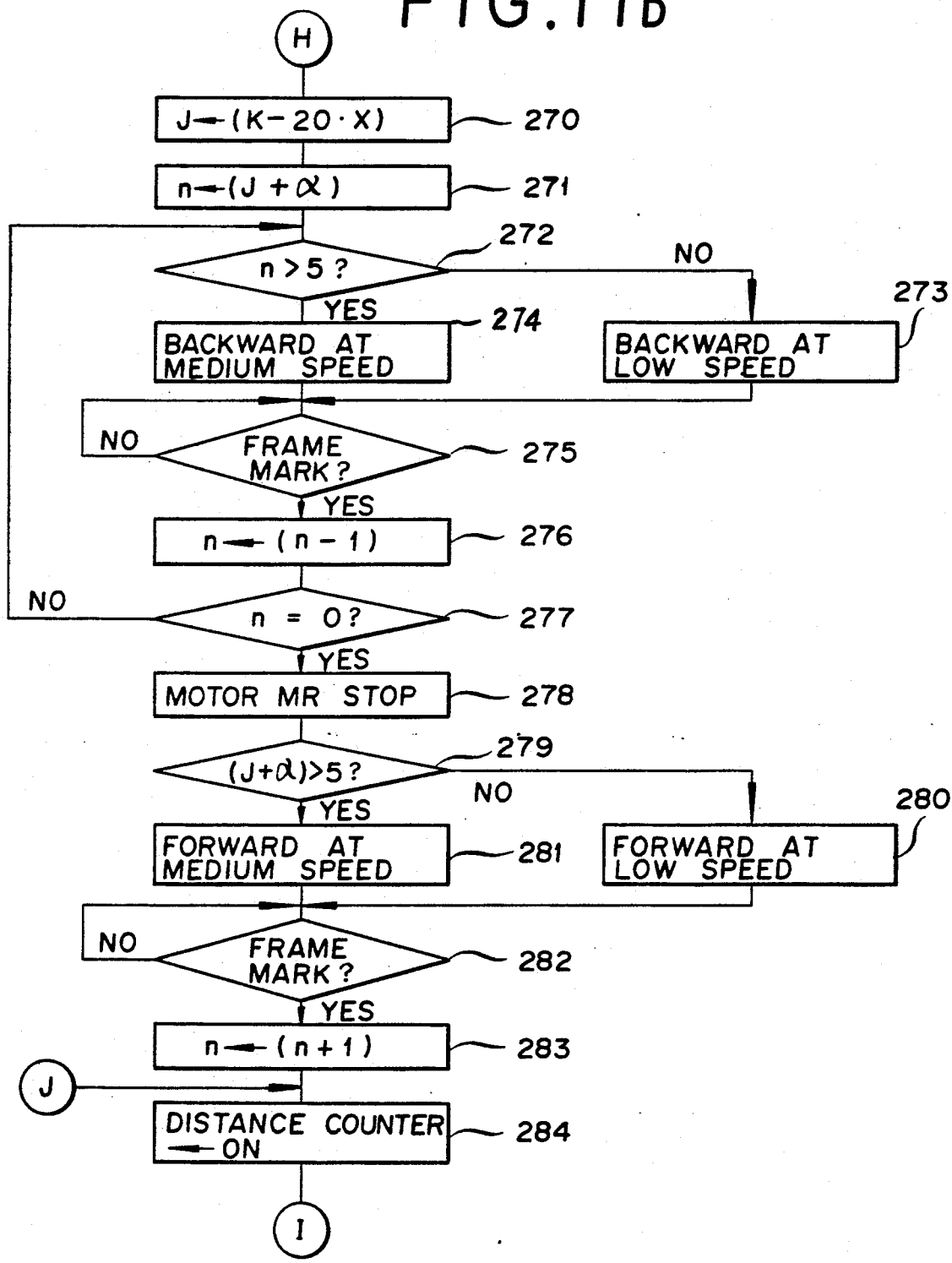

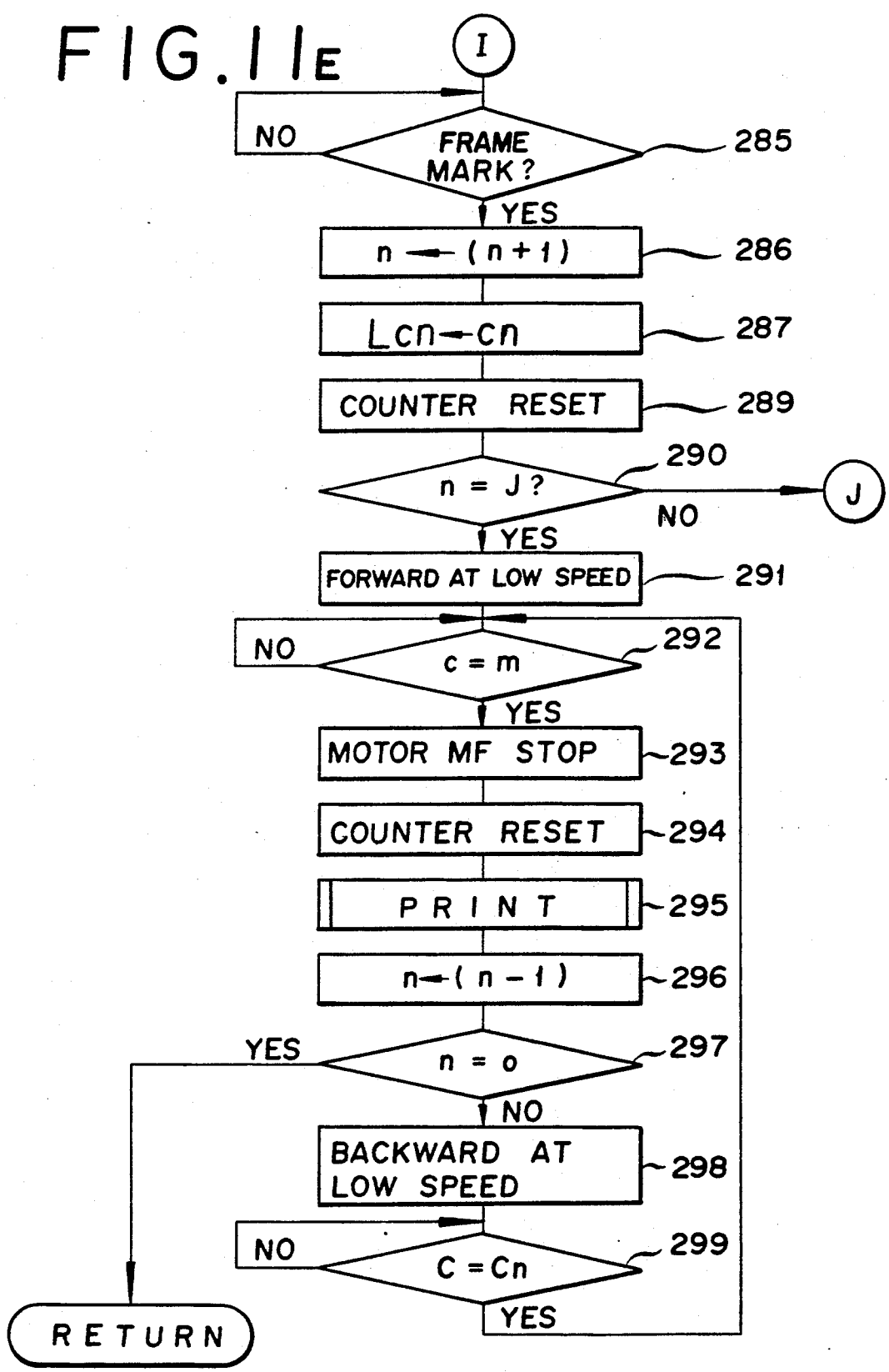

MICROFILM HANDLING SYSTEM

BACKGROUND OF THE INVENTION

1. Field of the Invention:

This invention relates to a microfilm handling system for retrieving from among a multiplicity of image information frames recorded on a microfilm a desired one and setting the retrieved frame in place at a projecting position.

2. Description of the Prior Art:

Generally, a microfilm is provided with a multiplicity of frames to which blip marks are affixed severally. A microfilm handling system which handles a microfilm of such a construction is provided with a sensor which, by virtue of its ability to discern the blip marks, serves the purpose of searching the multiplicity of frames on the microfilm and retrieving a desired frame out of them.

Among microfilm handling systems in popular use is counted a microfilm handling system of the type having a sensor for blip marks disposed inside a projected light path through which an image is projected. The system of this type has the advantage of allowing a light source which is primarily used for projection of an image to be additionally used the detection of the blip marks by the sensor and, in the meantime, suffers from the disadvantage that the sensor is prevented from clearly discerning blip marks when illuminance on the microfilm is varied for the image projection. For the purpose of enhancing a precision with which the detection of the marks is performed, adoption of a system of the type having the sensor and its own light source for the detection of marks disposed outside the projected light path may be conceived. In the system of this type, since the sensor obtains light from its own light source, it is enabled to detect the marks satisfactorily at all times.

Incidentally, in the system of the type having the sensor disposed outside the projected light path, the sensor is disposed on the microfilm feeding side relative to the position for the projection of an image for the sake of convenience of the conveyance of a microfilm. At the time that the mark of the frame being retrieved reaches the detecting position of the sensor, the corresponding frame falls on the location apart from the projected light path of an image. After the sensor has detected the mark corresponding to the retrieved frame, the microfilm is advanced by a distance equalling the interval between the sensor and the projected light path so that the retrieved frame will be set in the projected light path.

The technique of enabling a plurality of interrelated frames to be discerned as one group, batch or block out by changing the marks in size or position has been known to the art. In the case of a patent specification which consists of a plurality of pages, for example, the image frames of the microfilm containing the first through last pages of this patent specification are discerned as one batch or block. In the microfilm handling system which is capable of discerning the plurality of frames as one batch as described above, enabling the plurality of frames included in the one batch may be sequentially copied by a copying operation (Japanese Patent Publication 60-23,338 and Japanese Patent Publication 60-24,452).

In accordance with the reader printer disclosed in the patent publication mentioned above, when the plurality of frames in one batch are to be copied, the copying is started from the last frame and continued until the first frame, with the microfilm moved backwardly to successive intervening frames. By starting the copying from the last frame in this manner, the convenience in the handling of produced copies is notably augmented because the copies of the frames are piled up in sequence from the copy of the last frame on a discharge tray. Incidentally, the reader printer disclosed in these patent publications has the sensor for the detection of the blip marks disposed inside the projected light path.

SUMMARY OF THE INVENTION

A principal object of this invention, therefore, is to provide a microfilm handling system which has a sensor disposed outside the projected light path and allows the last through first of the plurality of frames in one batch to be smoothly set in place successively in the projected light path.

Another object of this invention is to provide a microfilm handling system which is capable of recognizing a plurality of frames as one batch and, at the same time, memorizing the positional relation of the component frames of the batch, and effecting the conveyance of a microfilm in accordance with the memorized positional relation.

BRIEF DESCRIPTION OF THE DRAWINGS

FIG. 8A through FIG. 8C are flow charts illustrating a procedure for the operation of the reader printer.

FIG. 9 is a flow chart illustrating another procedure for the operation of the reader printer to produce a plurality of copies from one frame.

FIG. 11A through FIG. 11E are flow charts illustrating another procedure for the operation of the reader printer.

While the present invention will hereinafter be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DESCRIPTION OF THE PREFERRED EMBODIMENTS

Figure 1:
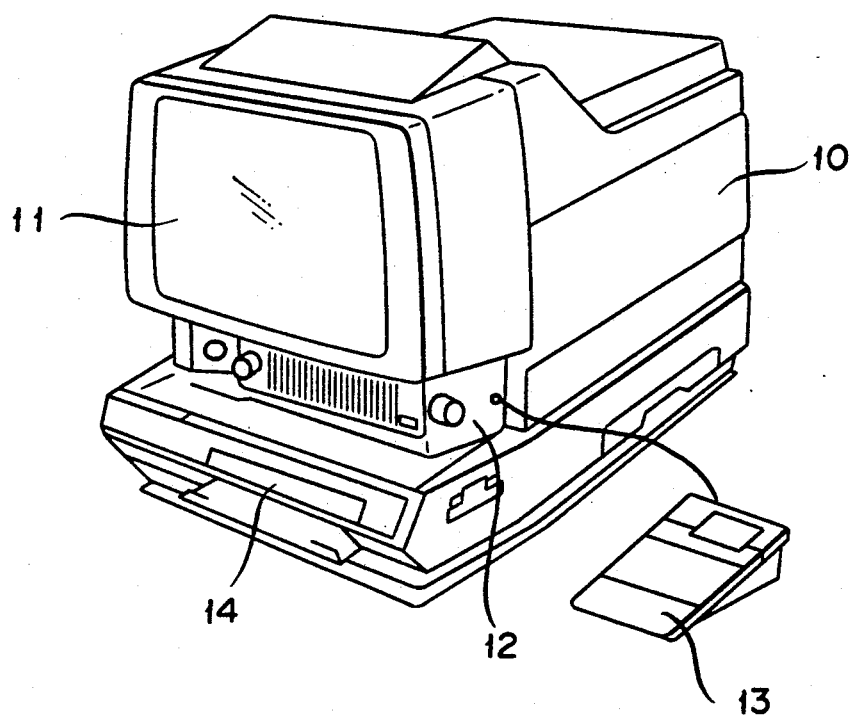
FIG. 1 is a perspective view illustrating a reader printer embodying the present invention.

As depicted in FIG. 1 a screen 11 is disposed in the front side of a reader printer housing 10 so that images recorded on a microfilm will be projected on this screen 11. The microfilm is loaded inside a carrier 12 which is disposed beneath the screen 11. To allow the copying of images recorded on the microfilm, the reader printer housing 10 incorporates therein a conventional electrophotographic copying device 15 (FIG. 2) provided with a photosensitive drum 15a. For the operation of this reader printer, a retrieving board 13 to be used mainly for the impartation of a motion to the microfilm is connected to the reader printer housing 10 and a copying board 14 to be used for copying a retrieved image is disposed on the front side of the reader printer housing 10.

Figure 2:
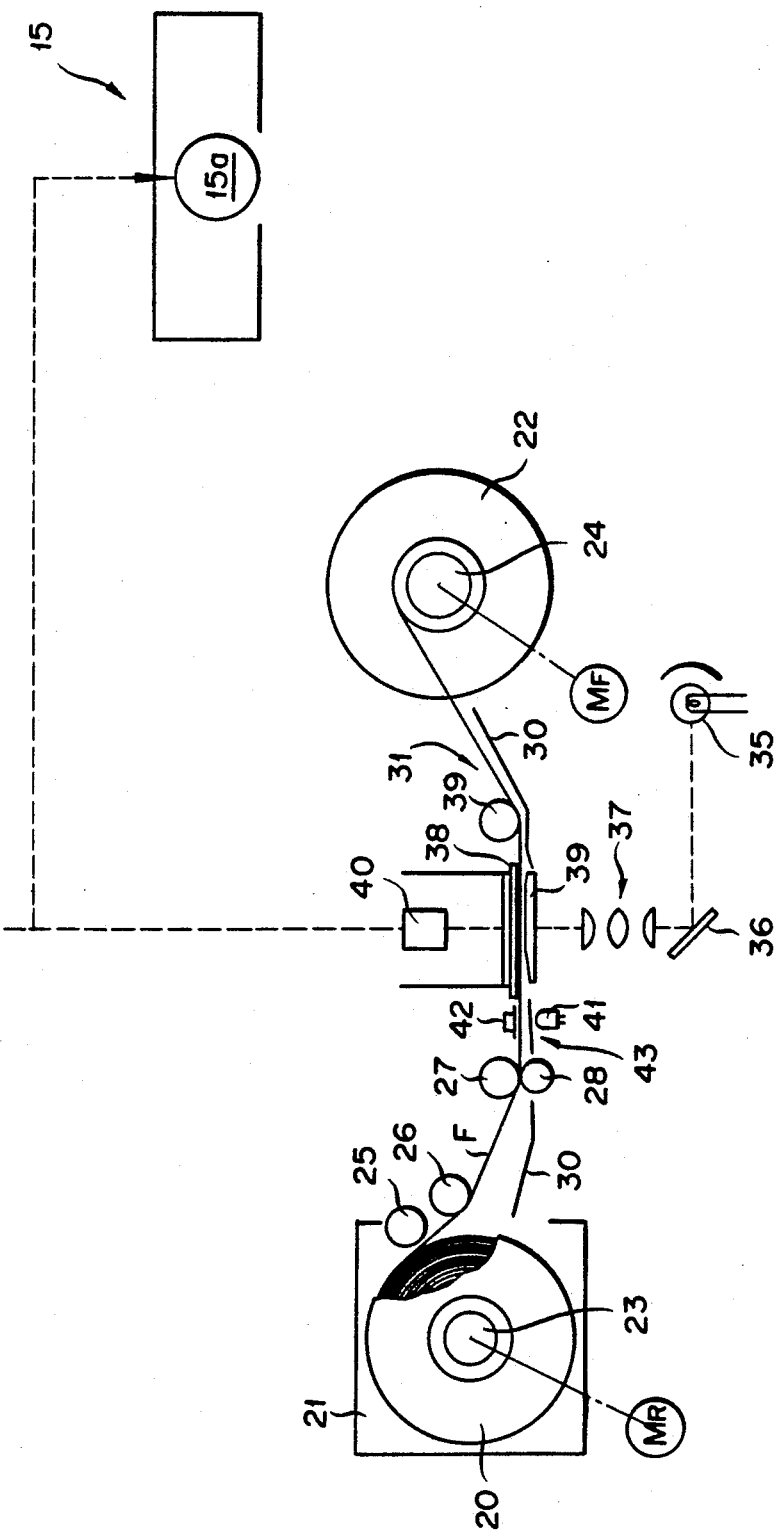
FIG. 2 is a schematic front view illustrating a film carrier part incorporated in the reader printer shown in FIG. 1.

The carrier 12 shown in FIG. 1 has an internal structure as illustrated in FIG. 2. As illustrated in the diagram, the microfilm F is wound up in a rolled form on a supply reel 20 and this supply reel 20 is rotatably supported on a cartridge 21. This cartridge 21 is inserted through an opening (not shown) disposed in the left terminal part of the carrier 12. The microfilm F played out of the supply reel 20 inside the cartridge 2 is rewound on a takeup reel 22 disposed inside the carrier 12.

The supply reel 20 is rotated selectively in the direction of playing out the film F and the direction of taking up the film F by a drive shaft 23 adapted to be driven by a supply reel driving motor MR. This drive shaft 23 is inserted in the core part formed in the central part of the supply reel 20 in response to the loading of the cartridge 21. The takeup reel 22 is rotated by a drive shaft 24 which is connected to the takeup reel driving motor MF.

For the purpose of advancing the leading end part of the microfilm F played out from the cartridge 21 in the direction of the takeup reel 22, the carrier 12 is further provided with a delivery roller 25 driven by a motor (not shown), a guide roller 26 for guiding the film sent out by the delivery roller 25, an encoder 27 for counting the distance of transfer of the microfilm F in the forward or backward direction, an auxiliary roller 28 to maintain the microfilm in tight contact with the encoder 27, a guide roller 29 disposed for guiding the microfilm F after passing between upper and lower pressure glass plates 38 and 39, and a plurality of guides 30 arranged between the two reels 20, 21. These guides 30 give rise to a film transfer path 31.

Figure 6:
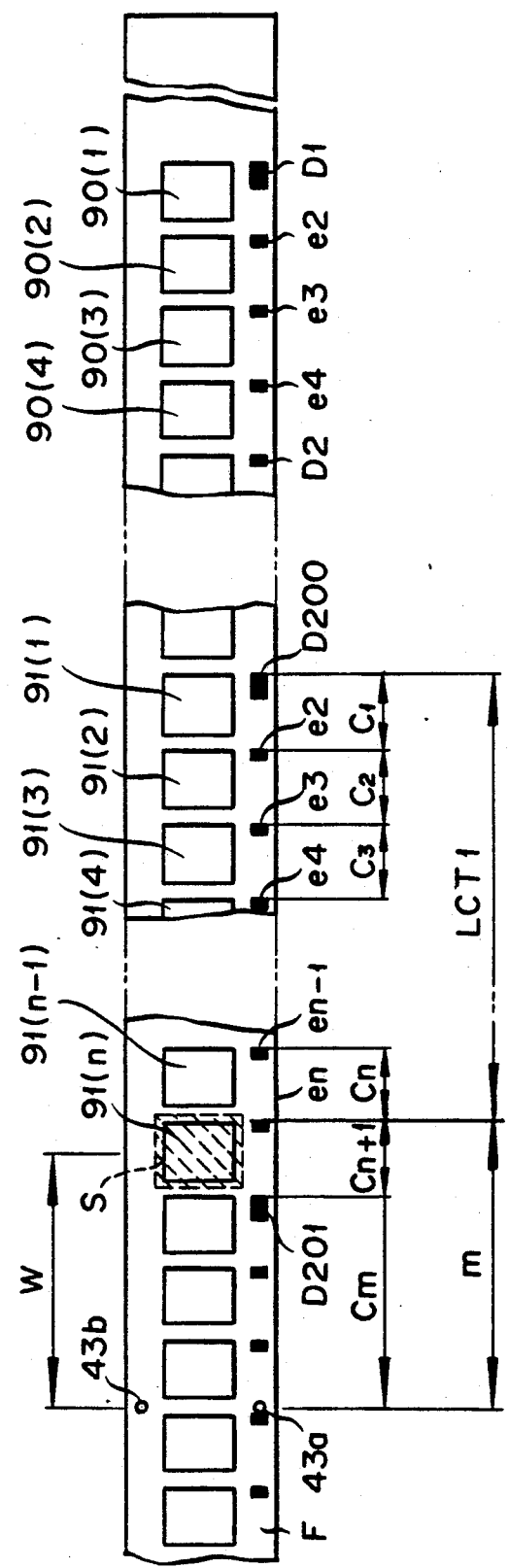
FIG. 6 is a plan view illustrating a part of a microfilm held in a state in which the last of the plurality of frames in a designated batch is set in place in the path for the light to be projected through an image.

As illustrated in FIG. 2, a lamp 35 illuminates the microfilm F positioned between upper and lower pressure glass plates 38, 39 through a reflecting mirror 36 and a group of condenser lenses 37. An image recorded on the microfilm F is enlarge magnified with a projecting lens 40 and projected on the screen 11. The pressure glass plates 38, 39, therefore, are positioned in a projected light path S (FIG. 6). During the copying of image information, the light passed through the projected light path S is directed on the photosensitive drum 15a. This light path is switchable by motion of a mirror (not shown) for copying the image frame.

On the upstream side in the microfilm supplying direction relative to the glass plates 38, 39 mentioned above, a light emitting element 41 such as an LED and a light receiving element 42 such as a photosensor, jointly adapted to read blip marks affixed to the film F correspondingly to the frames recorded on the film F, are opposed to each other to give rise to a sensor 43.

Figure 3:
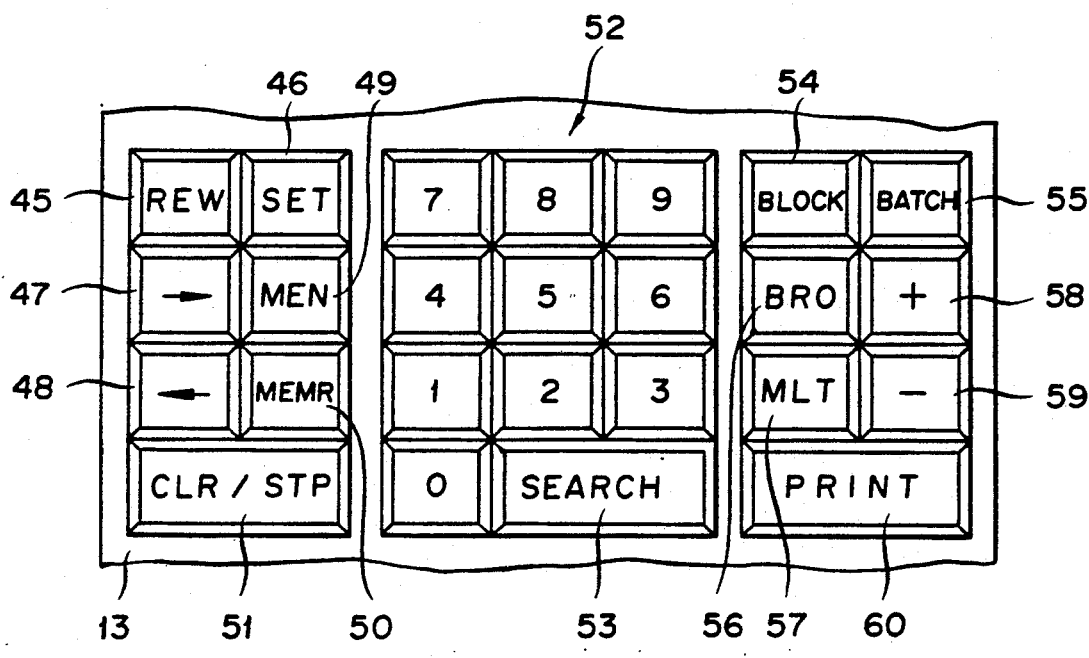
FIG. 3 is a plan view illustrating the essential part of a retrieving board shown in FIG. 1.

FIG. 3 is a diagram illustrating a retrieving board 13 shown in FIG. 1. A key 45 marked as "REW" is to be used for rewinding the microfilm by the supply reel 20. A key 46 marked as "SET" is to be used for setting the address or position of a frame. Keys 47, 48 marked with arrows are to be used for moving the film in the indicated directions for the purpose of fine adjustment. A key 49 marked as "MEM" is to be used for temporarily writing in the address of the frame in a buffer. A key 50 marked as "MEMR" is to be used for reading out the address from the buffer. A key 51 marked as "CLR/STP" is to be used for clearing the input fed in through a key and in effecting emergency stop of the motion in process. A ten-key pad 52 marked with the numerals 0 to 9 is disposed as juxtaposed to the keys mentioned above. A key 53 marked as "SEARCH" is to be used in starting the operation of retrieval. A key 54 marked as "BLOCK" is to be used for retrieving frames with reference to a mark of major classification recorded on the microfilm and a key 55 marked as "BATCH" is to be used for retrieving images with reference to a mark of medium classification. A key 56 marked as "BRO" is to be used for singling out relevant images and a mark 57 marked as "MLT" is to be used for putting in the number of copies of a given image to be produced. A key 58 marked as "+" and a key 59 marked as "−" are to be used for advancing the frames on the film, the key 58 for advancing the film forward by one frame and the key 59 moving the film backward by one frame. A key 60 marked as "PRINT" is to be used for starting the operation of copying. In the case of an operation involving address input, this key 60 serves as a command key for commanding retrieval and printing.

Figure 4:
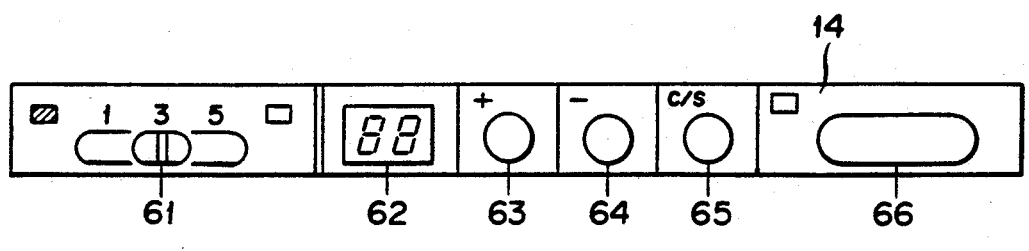
FIG. 4 is a front view illustrating a copying board shown in FIG. 1.

FIG. 4 is a magnified diagram illustrating the copying board 14 shown in FIG. 1. The amount of light to be produced by the light source 35 is varied by means of an exposure knob 61. The number of copies to be reproduced is displayed in a two-digit numeral on a display 62. A set button 63 marked as "+" is used for increment of the number of copies and a set button 64 marked as "−" is used for decrement of the number of copies. The number of copies set by these set buttons 63, 64 is displayed on the display 62. A reset button 65 is used for resetting the number of copies to be reproduced. The reset button 65 is also used for stopping the copying operation while the copying of the designated number of copies is in process. A copy button 66 is used for performing a copying operation of a desired image.

Figure 5:
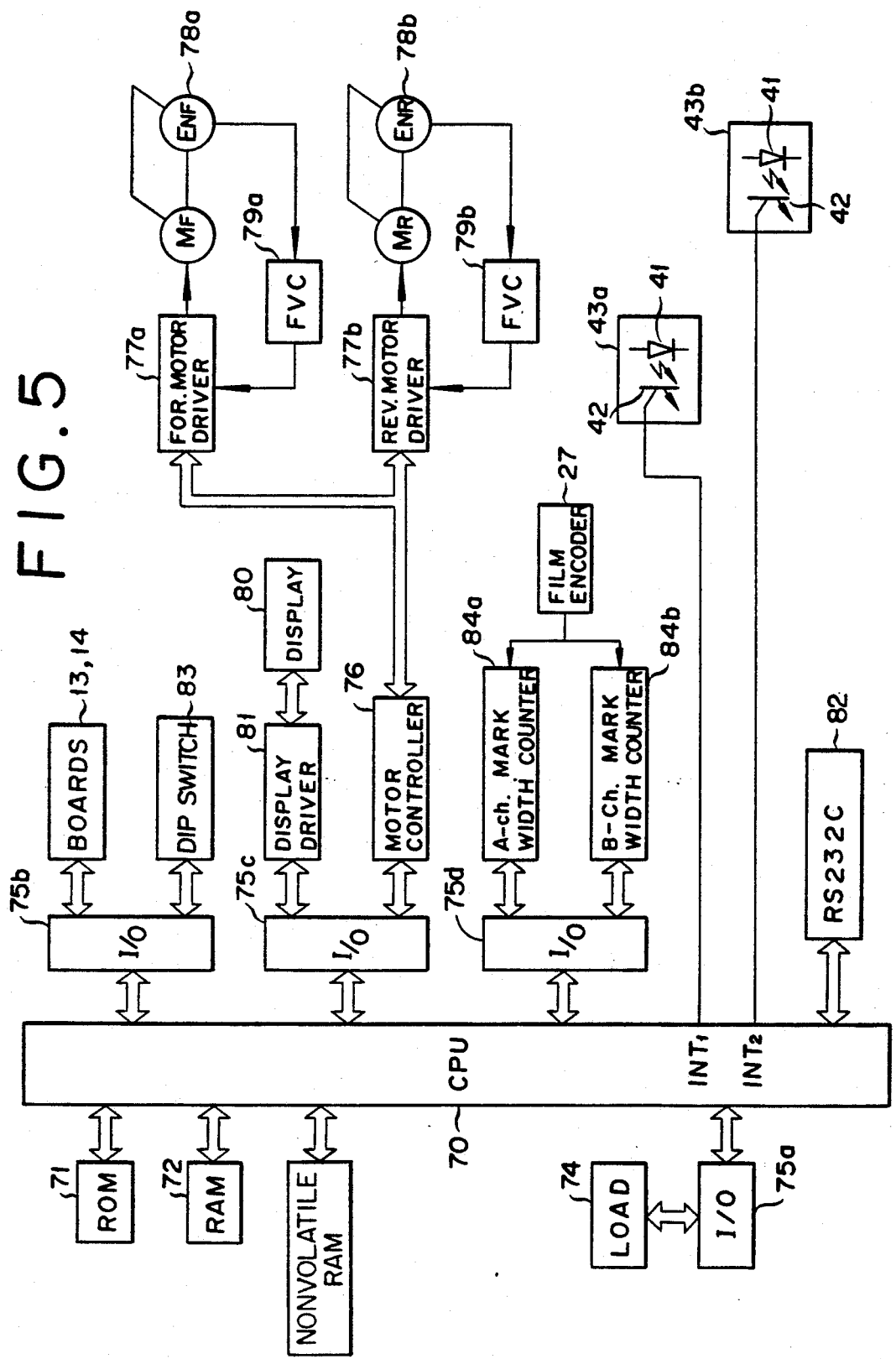
FIG. 5 is a block diagram illustrating a control circuit for the reader printer.

FIG. 5 is a block diagram illustrating a control circuit for controlling the operation of the reader printer. To a microcomputer CPU 70 are connected such memory media as an ROM 71, an RAM 72, and a nonvolatile RAM 73. To a load 74 embracing the component members such as a developing motor for the electrophotographic copying device 15 and a film feed clutch which are incorporated in the reader printer housing 10, control signals are transferred through the medium of an input-output port 75a. To the takeup reel driving motor MF shown in FIG. 2, control signals issued from the CPU 70 are transferred through the medium of an input-output port 75c, a motor controller 76, and a FOR motor driver 77a. For the purpose of permitting feedback control of the rotation of the motor MF, the pulse signal from an encoder 78a connected directly to the motor MF is transferred to the FOR motor driver 77a through the medium of a FV converter 79a. Similarly, the control signal from a REV motor driver 77b is transferred to the supply reel driving motor MR. The pulse signal from an encoder 78b connected directly to this motor MR is fed back to the motor driver 77b through the medium of a FV converter 79b.

To a display 80 disposed jointly on the retrieving board 13 and the copying board 14, the signal from the CPU 70 is transferred through the medium of an input-output port 75c and a display driver 81. The input signals from the keys disposed on these boards 13, 14 are transferred to the CPU 70 through the medium of the input-output port 75b. To the CPU 70 is connected a serial interface 82 (RS232C) for allowing communication with a host computer. A DIP switch 83 for setting the baud rate of the interface 82 and setting the conditions for retrieval is connected to the CPU 70 through the medium of the input-output port 75b.

A typical example of the microfilm F loaded in the reader printer is illustrated in FIG. 6. As illustrated in FIG. 6, the sensor 43 shown in FIG. 2 comprises a first sensor 43a for A channel for the detection of marks on one side of the microfilm F and a second sensor 43b for B channel for the detection of marks recorded on the other side of the microfilm F. These sensors 43a, 43b are disposed as deviated by a prescribed distance W on the upstream side in the advancing direction of the microfilm F relative to the projected light path S. In the film F illustrated in FIG. 6, the marks for retrieval are recorded on the A channel side.

The signals from the sensors 43a, 43b are transferred to the CPU 70 as illustrated in FIG. 5. For the purpose of deciding the width of the marks on the basis of the detection signals from the sensors 43a, 43b and the signals from the encoder 27 shown in FIG. 2, a mark width counter 84a for A channel and a mark width counter 84b for B channel are connected to the CPU 70 through the medium of an input-output port 75d.

On the microfilm F, the individual pages of a multiplicity of documents and drawings such as patent specifications are recorded as separated by a fixed interval so that each of the pages occupies one image frame. In the multiplicity of image frames recorded on the microfilm F, a plurality of image frames containing the component pages of one patent specification form one group or batch. In the leading end part of the microfilm F illustrated in the diagram, a batch of four frames 90 (1) to 90 (4) is contained. A batch mark D1 corresponding to the first page of the batch of frames or the leading frame 90 (1) is recorded on the film F. By the same token, a batch mark D2 corresponding to the first frame or the first of the plurality of pages of the second batch is recorded. The symbol D200 denotes a batch mark which corresponds to the first frame or the first of the plurality of pages of the 200th batch and the symbol D201 denotes a batch mark which corresponds to the first frame or the first of the plurality of pages of the 201st batch.

On the film F, frame marks e corresponding to the second and subsequent frames in one batch of frames are recorded. In FIG. 6, the symbol e2 in the first batch denotes a frame mark corresponding to the second frame containing the second page of the first specification. The symbol e4 in the first batch denotes a frame mark which corresponds to the frame containing the fourth page or the last of the plurality of pages of the first specification.

These batch marks and the frame marks severally constitute themselves blip marks for retrieval and they are detected by the first sensor 43a and not by the second sensor 43b. In the marks affixed correspondingly to the component frames of the microfilm F, the distinction between the batch marks and the frame marks is drawn by the signal from a mark counter 84a shown in FIG. 5 by virtue of the difference in size between the batch marks and the frame marks in the direction of conveyance of the film F.

The batch mark by example the batch mark D1 which corresponds to the leading one of the plurality of frames in one batch, therefore, functions additionally as a frame mark for the leading frame. It is permissible to use a film having the batch marks affixed at the position corresponding to the second sensor 43b or a duo-type film, the marks corresponding to the image frames in one row are detected by the first sensor 43a and the marks corresponding to the image frames in the other row are detected by the second sensor 43b.

In the reader printer constructed as described above, the manner in which the film is conveyed for the copying in a plurality of image frames forming one batch will be described below with reference to FIG. 7.

Figure 7A:
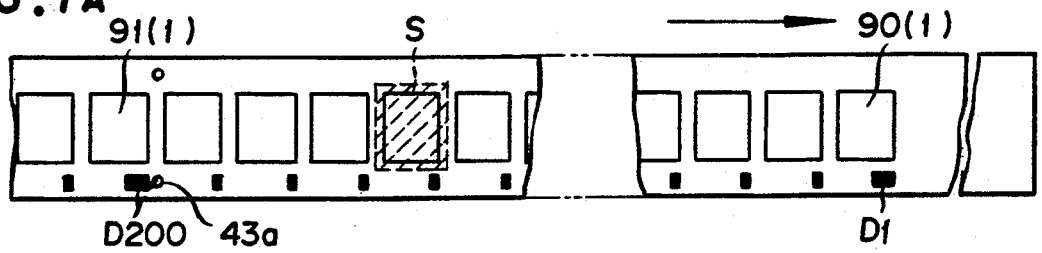
FIG. 7A through FIG. 7E are plan views illustrating a microfilm in a typical process of conveyance in the reader printer.

It is assumed that in a multiplicity of batches of image frames recorded in the microfilm F, a component image frames of the 200th batch will be copied. By the operation of the rewinding reel driving motor MF, the film F wound on the supply reel 20 is played out and rewound on the takeup reel 22. FIG. 7A represents the state in which the batch mark D200 affixed corresponding to the leading frame 91 (1) of the 200th batch of image frames to be retrieved has approached the sensor 43a in consequence of the advance of the film F effected as described above. When this batch mark D200 passes the sensor 43a and the trailing end edge thereof is detected by the sensor 43a, the motion of the film is stopped with a stop signal sent to the motor MF.

Figure 7B:
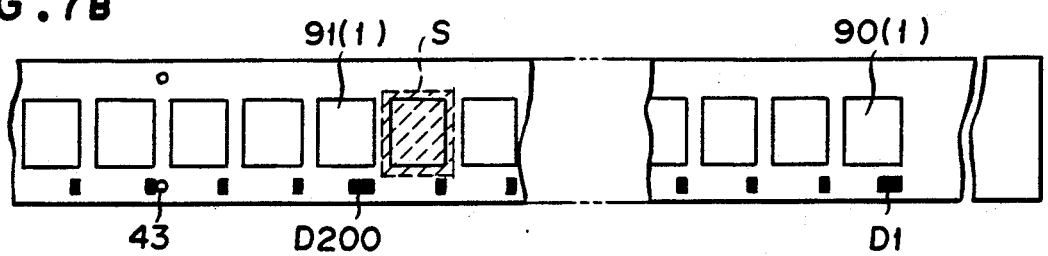

The motion of the film preceding this state is made at a high speed to expedite the operation of retrieval. Even when the motor MF is suddenly stopped, the film cannot be stopped instantaneously at the moment of the stop of the motor. Thus, the film is suffered to overrun to a certain distance. FIG. 7B represents the state in which the film has come to a stop after completing the overrun following the sudden stop of the motor MF. The time preceding this stop of the film is empirically determined and stored in advance in such a memory medium as the aforementioned ROM 71.

Figure 7C:
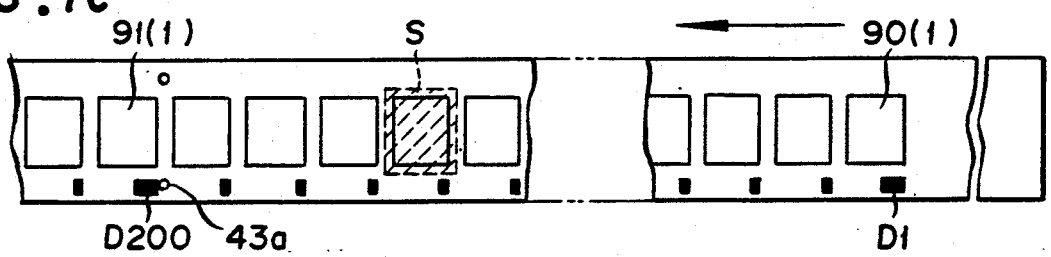
Figure 7D:
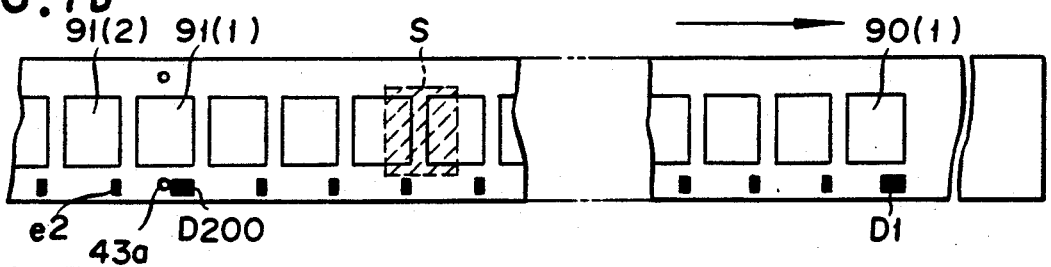
Figure 7E:
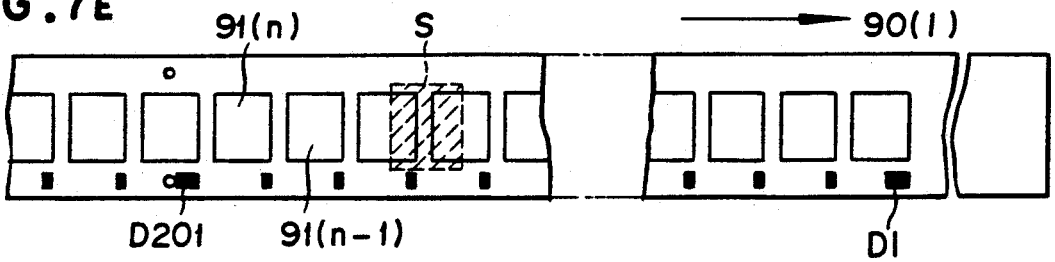

Then, as illustrated in FIG. 7C, the film is moved backwardly at a medium speed. After the batch mark D200 has passed the sensor 43a, the film is again brought to a stop and then advanced at a low or medium speed. As a result, the batch mark D200 is caused to pass the sensor 43 once again as illustrated in FIG. 7D. At the time that the batch mark D200 has reached the sensor 43a, the distance counter is turned on to count of the pulses emitted from the encoder 27 and to store in such memory as a RAM the distance between the edge of the batch mark D200 and the edge of the frame mark e2 corresponding to the image frame 91 (2) of the second page. Then, the distance between the edge of the frame mark e2 and the edge of the frame mark e3 is detected and put to the memory. The detection and memorization of the distance between the edge of a frame mark and the edge of a next frame mark are continued, with the film kept in motion at a medium speed, until the next batch mark D201 reaches the sensor 43a. FIG. 7E represents the state in which the next batch mark D201 has passed the sensor 43a. The distances intervening between the frame marks which are present between the batch mark D200 and the next batch mark D201 have been stored in the memory. The intervening distances between the frame marks equal the distances between the centers of the image frames.

In the state in which the sensor 43a has detected the next batch mark D201, the position of the last or n'th image frame 91 (n) in the batch being retrieved deviated from the position of the projected light path S as illustrated in FIG. 7 E, the film is advanced at a low speed until the last image frame 91 (n) conforms to the projected light path S.

As a result, the last image frame 91 (n) of the batch is brought into agreement with the projected light path S as illustrated in FIG. 6. In this state, the image information of the last image frame 91 (n) is copied by the electrophotographic copying device 15. Then, the film is moved backwardly at a low speed and the image information of the image frame 91 (n−1) next to the last image frame 91 (n) is similarly copied. The step of copying and the step of low-speed backward motion of the film described above are alternately repeated on each of the rest of the component image frames of the designated batch until the leading frame 90 (1).

In the retrieval of a desired one of the multiplicity of batches of image frames, that desired batch is designated with the ten-key pad 52 and the key 55 is depressed and the key 53 is subsequently depressed. Consequently, the first one of the plurality of image frames of that batch is retrieved and the image information in that frame is projected on the screen. In this case, a desire to copy the image so projected is generally accomplished by the depression of a button 66 on the copying board 14. When it is desired to retrieve a stated batch of image frames and, the component frames of that batch, the retrieval and the copying are attained by operating the ten-key pad 52 and the key 55 and subsequently depressing the key 60 on the retrieving board 13.

Figure 8A:
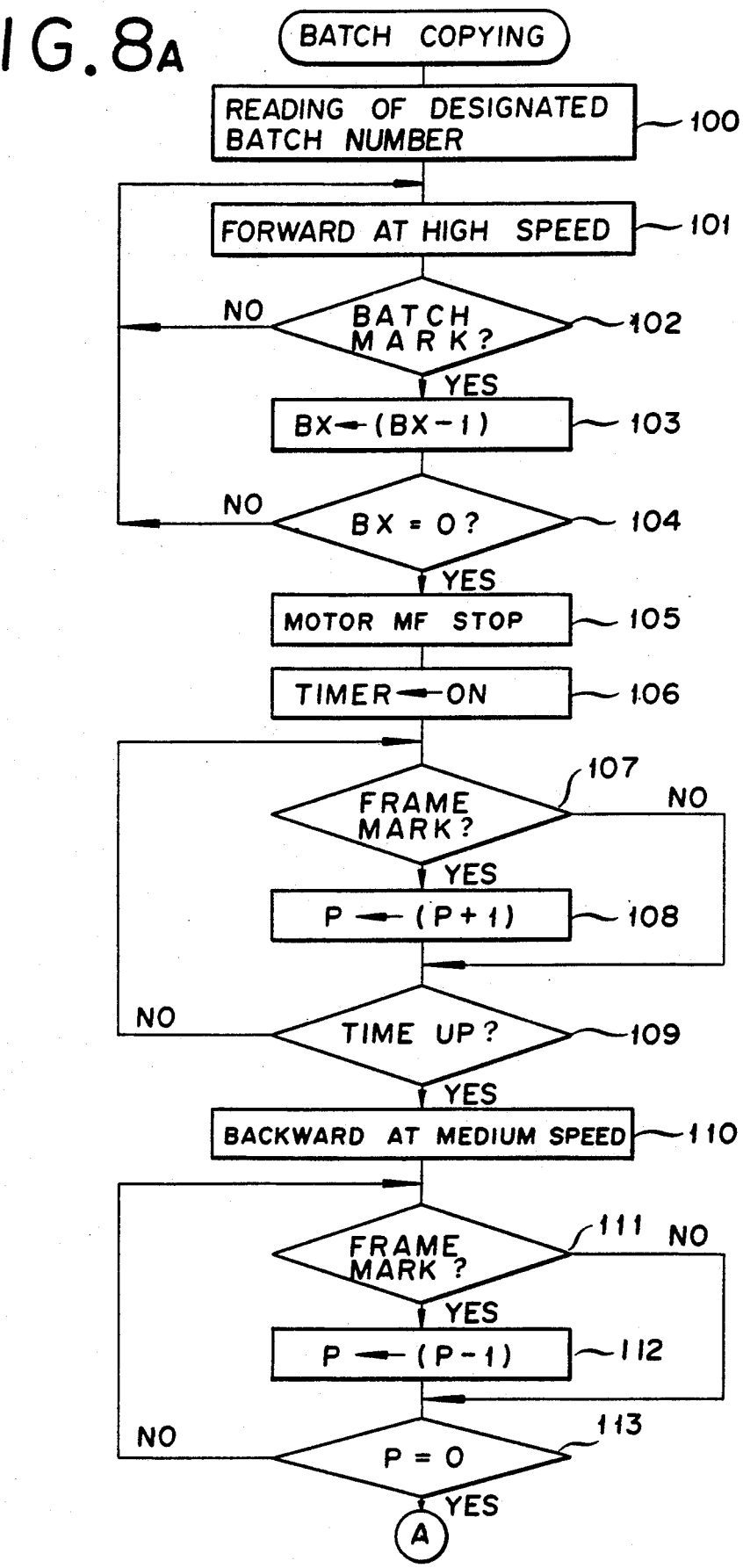

The manner of the motion of the film explained above with reference to FIG. 7 will be described more specifically below with reference to the flow charts of FIGS. 8A to 8C.

A desired batch number (numerical value for intermediate classification) is designated into the system by means of the key 55 and the ten-key pad 52 on the retrieving board illustrated in FIG. 3. The numerical value of the key input is read at Step 100 shown in FIG. 8A. The film is moved at a high speed in the forward direction as indicated in Step 101 by the rotation of the take up reel 22. During the course of this motion of the film, a preset number Bx according to the desired batch number is deducted by 1 in Step 103 each time the sensor 43a detects a batch mark as indicated in Step 102.

When the condition Bx=0 is fulfilled, namely the detection of the designated batch mark D200 is confirmed, in Step 104, the motor FM is immediately stopped in Step 105 and, at the same time, the timer is turned on in Step 106. This timer is located in the CPU 70 and adapted to start counting down the time empirically predetermined as an interval between the time the motor MF is stopped and the time the film F is actually stopped in response to the stop of the motor. Experimentally, the value of this time was found in the range of 0.3 to 0.5 second.

Then, an overrun processing routine indicated in Steps 107 to 113 is executed. First, during the interval between the stop of the motor MF and the actual stop of the film, the addition of 1 to the number of passed frames is effected in Step 108 each time the passage of a frame mark is discerned in Step 107. This addition is continued until the timeup in Step 109. FIG. 7B represents the state in which the film F has been stopped after the counting of two frame marks. Then, the motor MR is set moving and the film is moved backwardly at a medium speed in Step 110. In Step 111, the passage of a frame mark is discerned. If the result is NO, the routine proceeds to Step 113. If the result is YES, the value of P is decreased by one in Step 112 and the routine proceeds to Step 113. In Step 113, the routine returns to Step 111 if P does not equal zero and proceeds to Step 114 (FIG. 8B) if P equals zero. Consequently the distance covered during the overrun is eliminated by the time the number of frames, P, is counted down to zero in Step 113. FIG. 7C represents the state in which the film has been returned over this distance.

Subsequently, the film F is moved backwardly until the state of FIG. 7C, which corresponds when the sensor 43a detects the passage of the designated batch mark, namely the batch mark D200 in the preceding case, in Step 114 shown in FIG. 8B. The motor MR is stopped in Step 115 and then the motor MF is set moving and the film F is advanced at a low speed or medium speed in Step 116. As a result, the designated batch mark D200 is detected in Step 117.

In this state, the distance counter is turned on in Step 118. This distance counter is intended to determine the distance of motion of the film F by counting the number of pulses from the encoder 27. During the course from Step 120 through Step 123, the number of the component image frames of the designated batch and the distances intervening between the component frames are counted and memorized until the next batch mark, namely the batch mark D201 next to the batch mark D200, is detected by the sensor in Step 119. In other words when the frame mark is detected in Step 120, the addition of 1 to the number of frame marks, n, is effected in Step 121, the value, Cn, of the distance between the preceding frame mark and the present frame mark is stored in the register LCn in Step 122, and the distance counter is reset in Step 123. For example, as illustrated in FIG. 6, the distance C1 from the edge of the mark D200 corresponding to the leading image frame 91 (1) to the frame mark e2 corresponding to the next image frame 91 (2) is memorized and the subsequent distances C2, C3 are memorized successively. The distance, Cn, indicated in the diagram denotes the distance between the frame mark en corresponding to the last image frame 90 (n) containing the last of the component pages of the designated batch and the immediately preceding image frame mark en-1. The distance between the batch mark D201 affixed corresponding to the first of the plurality of pages of the subsequent batch and the aforementioned mark en, therefore, denoted as Cn+1.

When the detection of the next batch mark D201 is discerned in Step 119, namely when the state depicted in FIG. 7E is judged the film F is switched from the existent forward motion at a medium speed to the forward motion at a low speed in Step 124. By the forward motion of the film at this speed, the counted value Cm of the distance covered since the detection of the next batch mark D201 is calculated. When the fact that the total of this value and the aforementioned value of distance Cn+1 (i.e., Cm+Cn+1) has reached m is discerned in Step 125, the motor MF is stopped in Step 126. The value m mentioned above is correlated with the size of deviation W of the sensor 43a relative to the projected light path S. When the motor MF is stopped in Step 126, since the motion is continuing at a low speed, the film F is immediately stopped the last image frame 91 (n) in the designated batch of image frames is aligned, namely, centered relative to the projected light path S as illustrated in FIG. 6. In the state consequently, the image information in the last image frame 91 (n) is projected on the screen 11.

In Step 127, the total value of Cm and Cn+1 is reset. Then, a print subroutine is executed in Step 128. In Step 128, the image in the projected light path is caused to impinge on the photosensitive drum 15a inside the copying device 15 instead of on the screen 11, to effect the copying of the image. When the production of one copy is completed, the presence or absence of an image to be subsequently copied discerned in Step 129. When one batch happens to consist of only one page of image, for example, YES is drawn as an answer in Step 129 after completion of the step of copying in Step 128. When one batch is composed of a plurality of image frames each containing one page of information as usual, NO is drawn as an answer in Step 129 and the processing of Step 130 is executed after completion of the copying of the image frame.

This Step 130 is intended to start the reading of the value of the counter of the distances intervening between the frame marks. In Step 131, the film F is moved backwardly at a low speed by the distance obtained by the reading mentioned above. When the fact that the film has been moved backwardly by the memorized distance is discerned in Step 132, the deduction of 1 from the number of frames is effected in Step 133 and the processing is returned to Step 126. As a result, the next image frame is copied. In other words, when the image frame 91 (n) has been already copied, the image frame 91 (n−1) is now copied. All of the image frames up to the leading image frame 91 (1) are copied by repeating Steps 126 through 133. When the copying of all of the image frames is completed, the processing is advanced to Step 134.

There are times when a plurality of copies are desired to be produced from each of the component image frames of a designated batch. When the system is set for the production of a plurality of copies per an image frame, the copying is effected in the present reader printer by producing copies one each of the component image frames from the last through the first image frame and repeating this procedure all over as often as required. The reason for this method is that when the procedure of continuously producing the stated number of copies from one after another of the plurality of image frames is used, the operator after completion of the copying operation is burdened with an extra work of redistribution of a pile of a stated number of sets each of identical copies so as to obtain new sets each of serially arranged copies.

In Step 134, therefore, the deduction of 1 from the preset number of copies desired, namely the multiround number M, is effected each time the production of one set of copies is completed. When the number of rounds of copying is 1 or more after the deduction, NO is drawn as an answer in Step 135. In this case, the subroutine for the preparation of the second and subsequent rounds of copying, namely, the subroutine for the preparation of a plurality of rounds of copying, is executed in Step 136.

This subroutine is illustrated in detail in FIG. 8C. Since the first image frame 91 (1) is positioned in the projected light path S after completion of the preceding round of copying, Step 137 is intended to calculate the distance required for causing the last image frame 91 (n) to be set again at the position mentioned above by the forward motion of the film. This distance is the value LCT1 which is the total of the values from C1 through Cn as illustrated in FIG. 6.

After this value LCT1 has been calculated in Step 137, the distance counter is turned on in Step 138 and the question as to whether or not this value LCT1 is greater than Y is decided in Step 139. This Y is set at the value of the distance equivalent to one or two image frames. When the distance to the last image frame is greater than Y, the film is moved at a medium speed for the purpose of shortening the time required for the film transfer. When YES is drawn as an answer in Step 139, therefore, the film F is advanced at a medium speed in Step 140. In Step 141, the question as to whether or not the result of the deduction from the aforementioned value LCT1 of the value LCR of the distance of transfer of the film F counted by the encoder equals Y is decided. When this decision draws an affirmative answer, Step 142 is executed to advance the film F at a low speed in the same manner as when the decision in Step 139 draws NO as an answer. When the result of the deduction of the value LCR from the value LCT1 is 0, namely, when the last image frame 91 (n) concurs with the projected light path S, YES is drawn as an answer in Step 143 and the transfer of the film is stopped in Step 144.

After Step 144 has been executed, the processing is returned to Step 127 and the production of the second and subsequent sets of copies is started. When the production of the second and subsequent sets of copies is performed by the method described above, the distances between the component frame marks memorized in Step 120 through Step 123 are repeatedly used as many times as the set number of copies. When the film F is repeatedly transferred, there may arise a possible deviation between the encoder roller 27 and the film F. More accurate setting of the image frames relative to the projected light path S can be attained by newly measuring the values of distances between the frame marks and adopting the newly measured values for the subsequent round of copying each time the production of one set of copies is completed.

FIG. 9 is a flow chart depicting the manner of copying described above. This flow chart corresponds to the subroutine for the preparation of second and subsequent rounds of copying in the preceding embodiment illustrated in FIG. 8C.

Figure 8B:
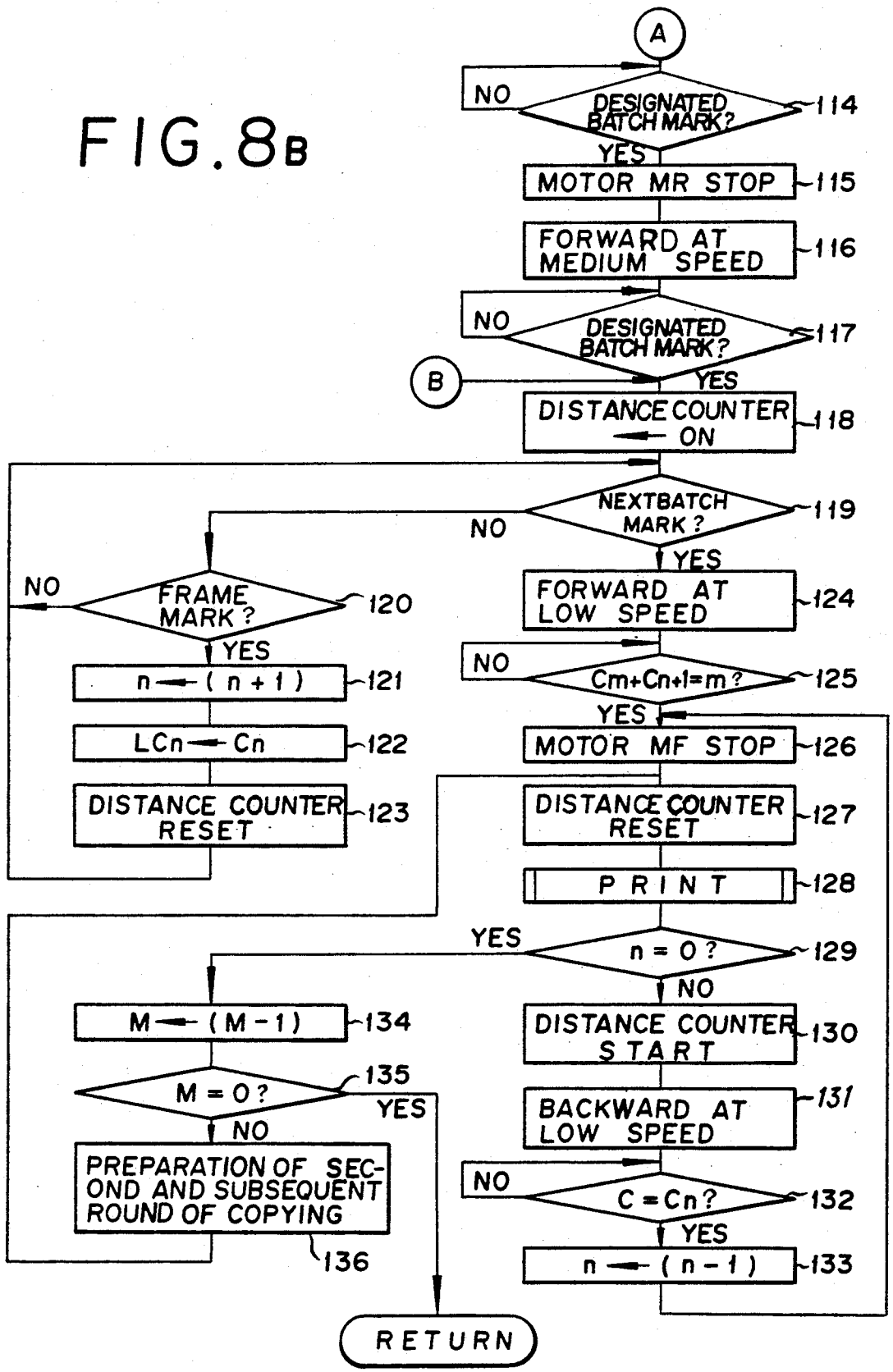

At the time that Step 135 shown in FIG. 8 B is completed, there exists the state in which the copying of the first of a plurality of component image frames as one batch has been completed and the leading image frame of this batch, i.e. the image frame 91 (1) in the preceding case, is positioned in the projected light path S. In Step 145, therefore, the film is moved backwardly at a low speed until the designated batch mark D200 affixed opposite the leading frame 91 (1) is returned to the position of the sensor 43a. When this return is completed, the decision in Step 146 draws YES as an answer, and the motor MR is stopped in Step 147 and the film is switched to a forward motion at a low speed or a medium speed in Step 148. As a result, the designated batch mark D200 detected in Step 149 is now detected while the film is in the process of forward motion and Step 118 shown in FIG. 8B is executed. From this point, the processing described above is carried out. Each time one round of copying operation is completed, Steps 119 through 123 are executed to renew the distances between the frame marks.

Figure 10A:
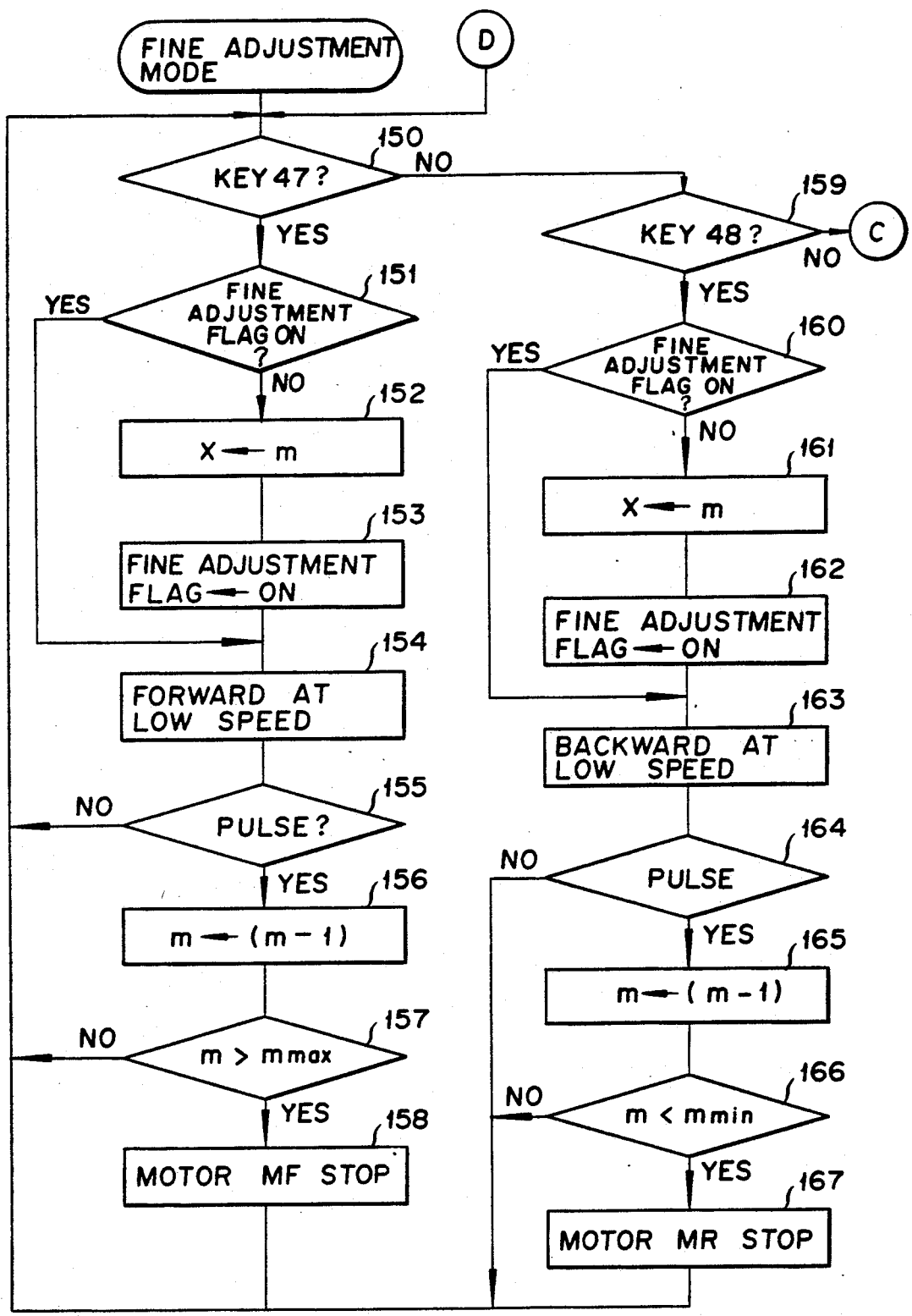
FIGS. 10A and 10B are flow charts illustrating fine adjustment mode.

There is the possibility that the distance m between the sensor 43a and a blip mark corresponding to an image frame positioned in the projected light path S shown in FIG. 6 will be varied as by the kind of the film to be loaded. For example, when a film having marks affixed at the centers of the image frames is loaded instead of the film which has the marks affixed as exactly aligned with the leading side edges of the image frames as illustrated, the values of the distances m mentioned above are different. In this case, the position of an image to be retrieved is deflected from the position of the projected light path S. The reader printer is capable of renewing the data of the distance counter pertinent to the deflection mentioned above, namely the pulse count value m of the encoder. The procedure for this renewal will be described below with reference to the flow chart of FIGS. 10A and 10B.

When the image frame set at the position of the projected light path S and projected at that position on the screen 11 is deflected to the left in the bearing of FIG. 6, the operator is required to advance the film by using the key 47 bearing an arrow mark indicating the direction of advance as shown in FIG. 3. When the image frame is deflected to the right side, the operator is required to move the film backwardly by the use of the key 48 bearing an arrow mark indicating the direction of backward motion.

When the operator's depression of the key 47 is discerned in Step 150, the question as to whether or not the fine adjustment flag has been put up is decided in Step 151. This fine adjustment flag is set up by the use of the keys 47, 48. When the decision in Step 151 draws NO as an answer, the data of the memorized distance m is designated as X in Step 152 and the fine adjustment flag is put up in Step 153. In this case, the key 47 has been depressed, the motor MF is set moving and the film is advanced at a low speed in Step 154. During this forward motion of the film, the number of pulses from the encoder is counted in Steps 155, 156. The maximum level is set for the value of the distance data m. The transfer of the film over a distance exceeding the maximum value m.max, is restricted in Steps 157, 158.

Figure 10B:
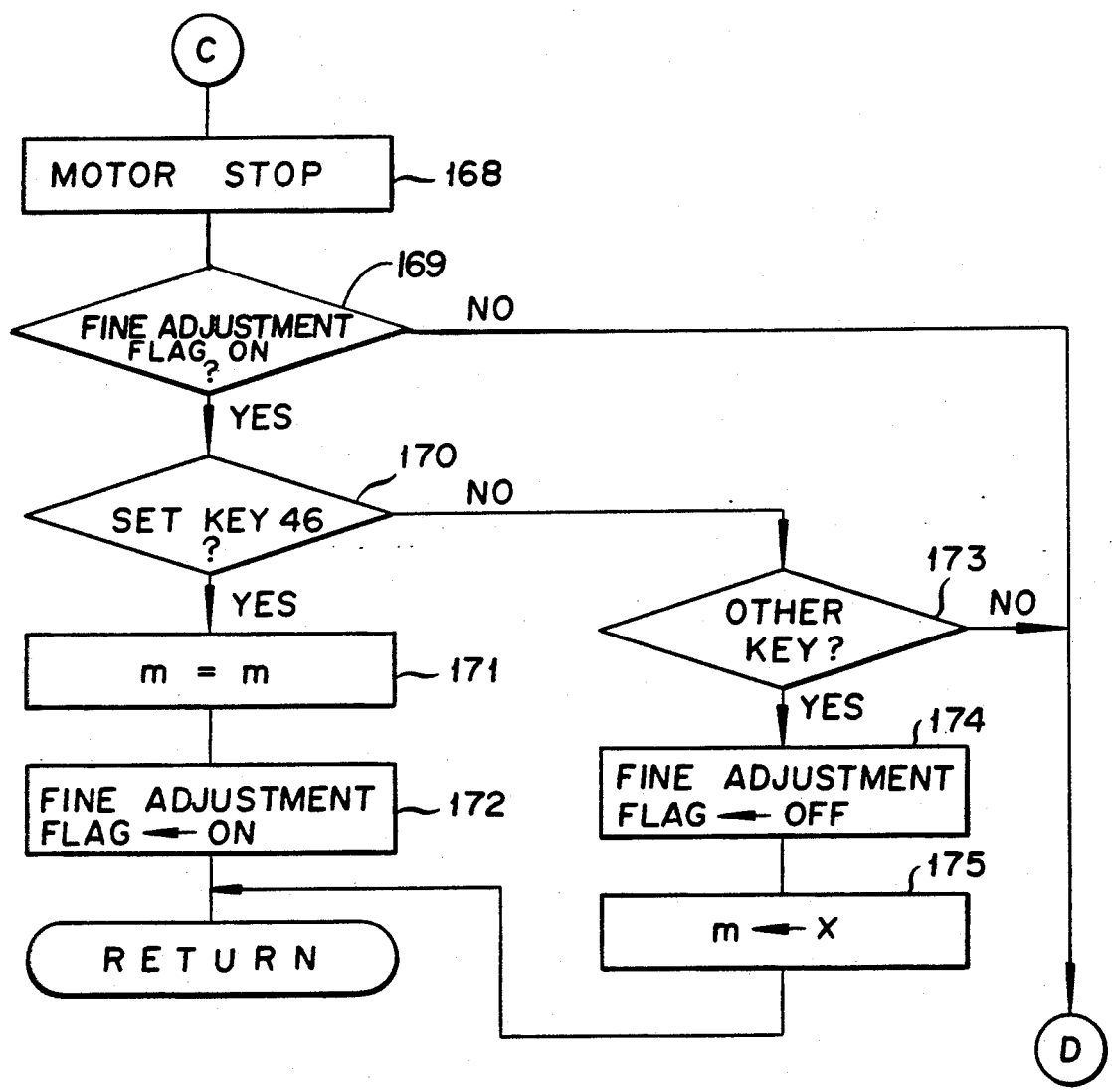

If in Step 150, key 47 has not been pressed, the routine proceeds to Step 159 to discern if key 48 has been pressed. If the answer in Step 159 is NO, the routine proceeds to Step 168 (FIG. 10B). If key 48 has been depressed, the status of the fine adjustment flag is determined in Step 160. If the fine adjustment flag is set to YES, the routine proceeds to Step 163. If, on the other hand, the result from Step 160 is NO, the data of the memorized distance m is designated as X in Step 161 and the fine adjustment flag is set to ON in Step 162.

In step 163, the motor MR is set moving in a backward direction at low speed. During this backward motion of the film, the number of pulses from the encoder is counted in Steps 164, 165. The minimum level is set for the value of the distance data m. The transfer of the film over a distance less than the minimum value m.min is restricted in Steps 166, 167.

The release of the keys 47, 48 from their depressed state causes the motor to stop in Step 168 and induces neither of the keys to be operated again. When these keys have been put to use in advance, the decision in Step 169 draws YES as an answer and new data m is stored in Step 171 after the fact that the set key 46 shown in FIG. 3 is operated has been discerned in Step 170. In this case, the fine adjustment flag is put on in Step 172. When the set key 46 is not operated and some other key is operated, this fact is discerned in Step 173 and the fine adjustment flag is put off and the distance data, m, are not renewed in Steps 174, 175.

As yet another manner of film transfer, the following method may be cited.

In the embodiments described above, the determination of the distances between the frame marks from the designated batch mark to the next batch mark is effected by advancing the film at a medium speed and, at the same time, taking count of the numbers of image frames as indicated in Steps 116 to 123. Optionally, there may be adopted a procedure which comprises advancing the film at a high speed thereby allowing only the number of frame marks to be counted from the time the designated batch mark is detected till the time the next batch mark is detected, then returning the film the position of the leading frame, controlling the speed of transfer in accordance with the number of frames counted and, at the same time, determining the distances between the frame marks. In this case, the transfer of the film is made at a low speed after the number of remaining frames subjected to the determination of distance has decreased to a certain degree. The transfer of the film as during the operation of copying is carried out in the same manner as described above.

Now, another manner of effecting the transfer of the film in the present reader printer will be described below with reference to the flow charts shown in FIG. 11A to FIG. 11E.

In this case, the total number of component image frames of one batch subjected to copying is calculated while the microfilm is in process of forward motion. Then, the total number of frames consequently determined by the calculation is divided by a stated number such as 20, namely the unit number of frames for one round of copying, into several portions or units. Then, for each of the portions, the leading image frame is moved to the position of the sensor 43a, the distances between the frame marks included within the portion are stored in the memory means while the film is in process of forward motion, and the last image frame of the portion is moved until it is centered in the projected light path. The image information contained in the last through the first of the image frames of that portion is copied on frame at a time with the film moved backwardly in the meantime. Where the number of image frames forming one batch is large, therefore, the accumulated value of deflection to be involved between the encoder and the film during the calculation of the distances of transfer of the film is notably restricted enough to ensure accurate location of images within the projected light path.

In this case, the identifying number of a desired batch of image frames in the microfilm can be designated by the use of the key 55 and the ten-key pad 52 on the retrieving board shown in FIG. 3 in the same manner as in the preceding embodiment. The numeral of the key input is read out in Step 200 shown in FIG. 11A and utilized in rotating the takeup reel 22 so as to transfer the film in a high speed in the forward direction as indicated in Step 201. During the course of this transfer of the film, when the sensor 43a detects the designated batch mark such as D200 as indicated in Step 202, the transfer of the film is switched to the forward motion of a medium speed in Step 203 and, at the same time, the frame counter adapted to take count of the number of frame marks is turned on in Step 204. When the answer is NO in Step 202, the routine returns to Step 201.

The counting of the number of frames is continued in Step 206 and Step 207 until the fact that the sensor 43a has detected the next batch mark, namely the fact that the batch mark D201 in the case shown in FIG. 6 has reached the position of the sensor 43a is discerned in Step 205. The symbol K indicated in Step 207 denotes the total number of frames. In the aforementioned Step 205, the motor MF is brought to a sudden stop in Step 208 when the decision in this step draws YES as an answer, namely when the fact that the next batch mark D201 is detected by the sensor 43a is discerned. Then in Step 209, the aforementioned total number of frames K is divided by a stated number of frames, namely the aforementioned unit number of frames such as 20 fixed for one round of copying, to determine an integral value L, with the decimal portion of the quotient discarded. The L is 7, for example, when the total number of frames K is 150. The unit number of frames for one round of copying mentioned above has been calculated in due respect of the possible accumulated error due to the slip suffered to occur between the encoder 27 and the film F when the film is transferred in accordance with the memorized data of distances between the frame marks. This unit number, therefore, need not be limited to 20 but may be set at a varying value.

In Step 210, the question as to whether the value of L is larger than 1 is decided. When L is not larger than 1, namely when the number of image frames included in one batch is 20 or below, the operation of copying is carried out with the transfer of the film carried out in the manner illustrated in FIG. 11B.

First, in Step 211, the film F is switched to a backward motion of a medium speed. Since the next batch mark D201 has already passed the sensor 43a, the motor MR is stopped in Step 213 when the batch mark D201 passes the sensor 43a and the designated batch mark D200 is detected in Step 212. Subsequently in Step 214, the film is switched to a forward motion of a medium speed. Since the designated batch mark D200 has already passed the position of the sensor 43a before the switch of the film to this forward motion of the medium speed, the batch mark D200 is detected by the sensor 43a during the course of this forward motion of the film in Step 215. In Step 216, since the number of image frames forming the 200th batch is short of reaching 20, the distance counter is turned on to determine the distances between all image frames of this batch, namely the distances intervening between the frame marks. This distance counter is intended to take count of the number of pulses emitted from the encoder 27 and determine the distance of transfer of the film F. The number of frame marks of the designated batch which have passed the sensor 43a and the distances intervening between the frame marks are counted and memorized in Steps 218 to 221 until the next batch mark, specifically the batch mark D201 next to the batch mark D200, is detected by the sensor 43a in Step 217.

To be specific, each time a frame mark is detected in Step 218, the addition of 1 to the number of frame marks n is effected in Step 219 and the value of distance Cn between the preceding frame mark to the present frame mark is memorized in the register LCn adapted to memorize this value in Step 220 and the distance counter is reset in Step 221. In this case, the number of n cannot exceed 20. If a frame mark is not detected in Step 218, the routine returns to Step 217.

The film is switched from the forward motion of a medium speed to the forward motion of a low speed in Step 222 when the fact that the next batch mark D201 has been detected is discerned in Step.217. Owing to the forward motion of the film at this speed, the count value of distance Cm is obtained since the detection of the next batch mark D201 mentioned above. The motor MF is stopped in Step 224 when the fact that the total of this value and the aforementioned value of distance Cn+1 (i.e., Cm+Cn+1) has reached m is discerned in Step 223. The symbol m denotes the size of the deflection of the sensor 43a from the projected light path S. When the motor MF is stopped in Step 224, the film is immediately stopped because the transfer of the film is proceeding at a low speed and, as a result, the last image frame 91 (n) in the batch of image frames being designated is positioned or centered in the projected light path S as illustrated in FIG. 6. In the ensuant state, the image information in the last image frame 91 (n) is projected on the screen 11.

The total value of Cm and Cn+1 determined as described above is reset in Step 225 and the print subroutine of Step 226 is executed. In this Step 226, the image thrown through the projected light path S is caused to impinge not on the screen 11 but on the photosensitive drum 15a inside the copying device 15 to effect the copying of that image. When the production of one copy is completed, the presence or absence of any other image to be copied is discerned in Step 227. When one batch of image frames happens to consist of only one page of image information, for example, the decision in Step 227 draws YES as an answer and the return of the step is effected when the operation of copying is completed in Step 226. When the operation of copying is continued to and completed in the last image frame, the decision in Step 227 draws NO as an answer and Step 228 is executed.

This Step 228 is intended to read out the values of distances between the frame marks already memorized in the distance counter. In Step 229, the film F is moved backwardly at a slow speed over the distance corresponding to the value to be read out as described above. The deduction of 1 from the number of frames is effected at Step 231 and the processing is returned to the aforementioned Step 224 when the fact that the film has been moved backwardly over the memorized distance is discerned in Step 230. As a result, the image next to the image already copied is copied. For example, when the image frame 91 (n) has been already copied, the next image frame 91 (n−1) will be copied subsequently.

Figure 11A:
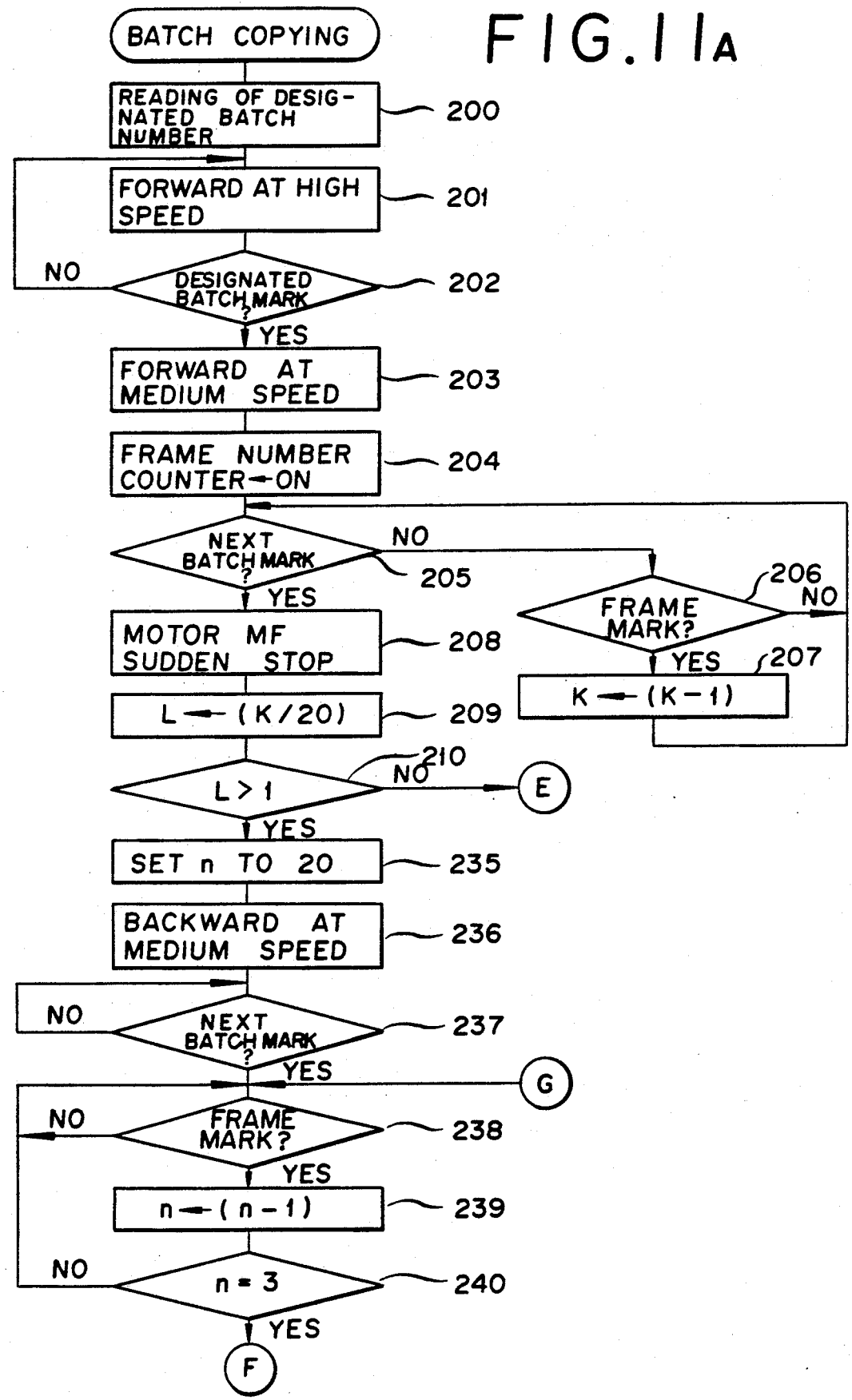
Figure 11B:
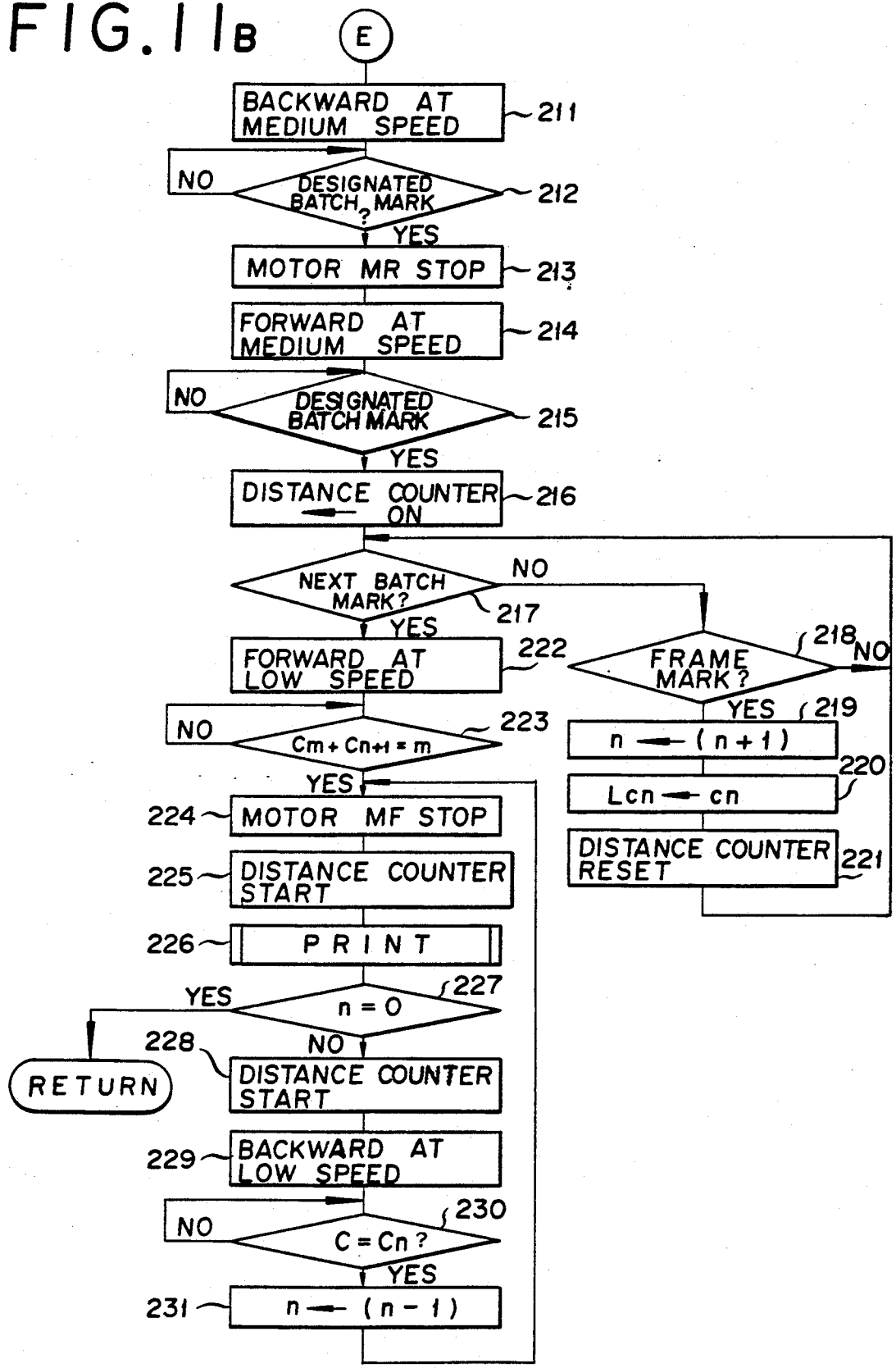
Figure 11C:
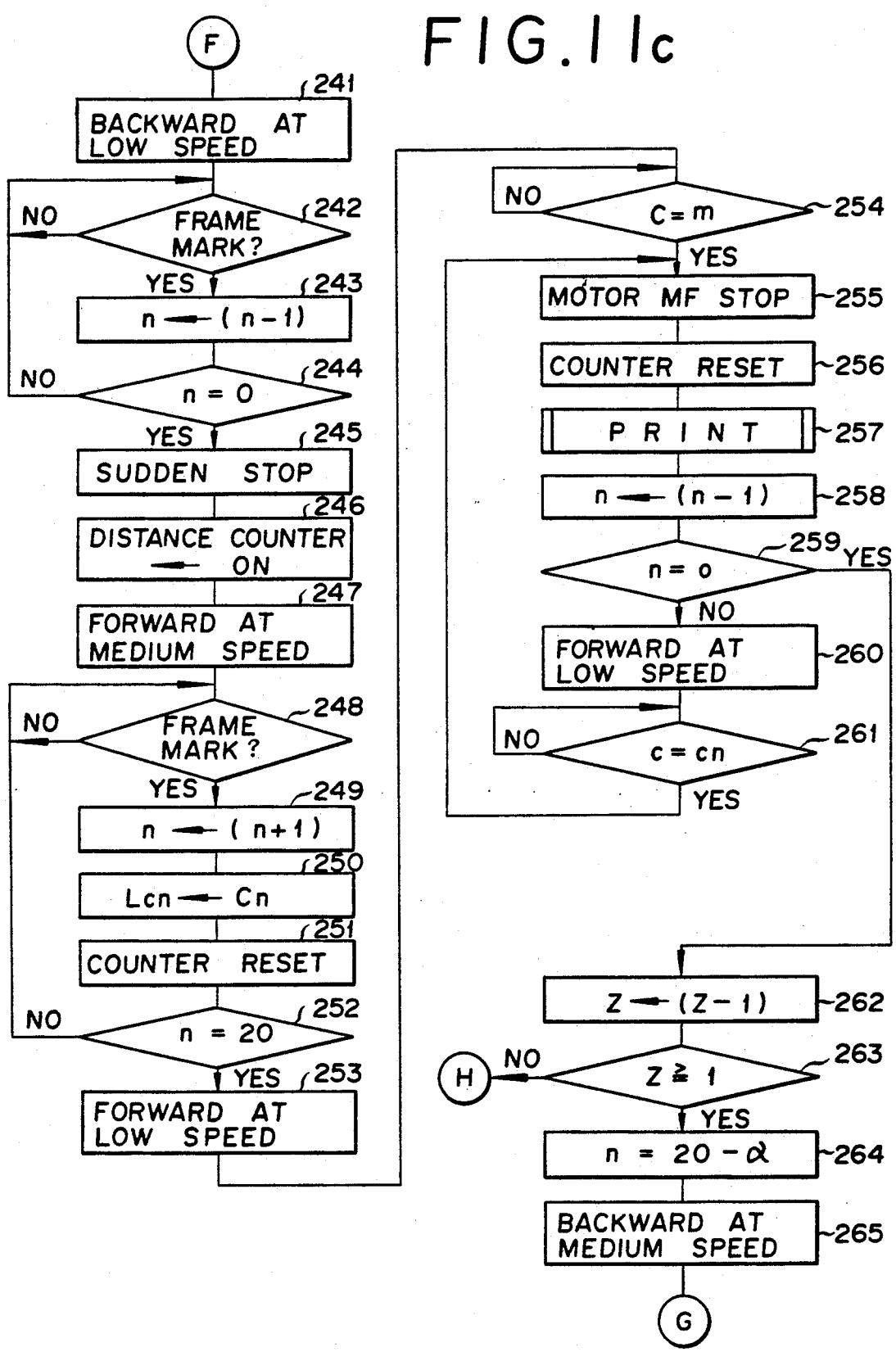

The steps indicated in FIG. 11B are those of a processing to be performed when the number of image frames forming one batch is less than 20. Where the number exceeds 20, the decision in the aforementioned Step 210 shown in FIG. 11A draws YES as an answer and Step 235 is executed. In this step, the number of image frames to be covered by one round of copying operation is set at the stated value, namely the unit number, 20. Then, at Step 236, the transfer of the film is set at the backward motion of a medium speed to return the film F. Since the next batch mark D201 has already passed the position of the sensor 43a before the aforementioned switch to the backward motion, the backward transfer of the film causes the next batch mark D201 to be detected in Step 237. If a hatch mark is detected at Step 237, at Step 239, the deduction of 1 from the value of n set at 20 is effected each time a frame mark is detected in Step 238. When the fact that the number of remaining frames to be moved backwardly has reached 3, for example, is discerned at Step 240, the transfer of the film is set at a backward motion of a slow speed in Step 241 shown in FIG. 11C. In other words, it is the aforementioned Step 240 that fulfils the part of determining the time at which the backward motion of the film is switched from the medium speed to the low speed. In Step 242, the passage of a frame mark is discerned. If the result is NO, the routine loops until the result from Step 242 is YES at which point the routine proceeds to Step 243. The number of frames is reduced by one in Step 243. In Step 244, the number of frames (n) is determined. If n does not equal zero, the routine return to Step 242. If n equals zero, the routine continues to Step 245. When the fact that the film has been returned by the continued backward motion of the film over the distance equivalent to 20 image frames through Step 242 to 244 is discerned, the motor MR is instantaneously stopped in Step 245 and the distance counter is turned on in Step 246.

For the purpose of memorizing the data of distances between the number of image frames which is set at 20, the film is advanced at a medium speed in step 247 and Steps 248 to 252 are executed. Each time a frame mark is detected in Step 248, the addition of one to the number of frame marks n is effected in Step 249 and the value of the distance Cn between the preceding frame mark to the present frame mark is memorized in the register LCn in Step 250, and the distance counter is reset in Step 251. The value Cn of the distances between the frame marks is kept in memory until the number of frame marks to be counted is determined to be 20 in Step 252. In the state in which the data are kept stored, the last of the 20 image frames in the one batch being designated assumes the position past the sensor 43a in the bearing of FIG. 6. Since the last image frame is not positioned at the projected light path S, the film is switched to the forward motion of a low speed at Step 253 and the film continues this forward motion of a low speed until the counter value C corresponding to the distance m of the deflection between the projected light path S and the sensor 43a is discerned in Step 254. The film is stopped in Step 255 when the decision in Step 254 draws YES as an answer.

Then, the counter is reset in Step 256 and then the print routine of Step 257 is executed. The film is moved backwardly one frame at a time over the distance based on the data of distances between the image frames already memorized and the operation of copying is performed after each backward motion. After the production of a copy of image information from one image frame has been completed, the deduction of 1 from the aforementioned value n is effected at Step 258 and the question as to whether or not the value n resulting from the deduction is zero is decided in step 259. When the value of n is found to be zero after the production of a copy from one image frame, this means that the remaining batch of image frames is composed of only one image frame. If the decision in Step 259 draws YES as an answer, the routine proceeds to Step 262. When there exists any image frame yet to be copied, the decision in Step 259 draws NO. as an answer and the film is moved forwardly at a low speed in Step 260. The distance of this forward motion is set on the basis of the already memorized data of distances. In Step 261, the processing is returned to Step 255 when the forward motion is determined to have covered the memorized distance. As indicated above, when the production of copies from all of the 20 image frames is completed, the decision in Step 259 draws YES as an answer and Step 262 is executed. This Step 262 is intended to find the value Z by the deduction of 1 from the aforementioned value L. When this value Z is not less than 1, the decision of the next Step 263 draws YES as an answer, Step 264 is executed and the number n resulting from the addition of α to the aforementioned number 20 of image frames is calculated. Since the leading image frame in one portion of 20 image frames is positioned in the projected light path S after the production of copies of all of the image frames is completed, the value of α equals the number of image frames positioned in the range extending from the projected light path S to the sensor 43a as clearly noted from FIG. 6. In the illustrated case, the value c is 4. After the value of n has been calculated, Step 265 causes the film to move backwardly at a medium speed and the processing is returned to the aforementioned Step 238 shown in FIG. 11A. As a result, the operation of copying is carried out again on the next 20 image frames in Step 238 through Step 263.

When one microfilm contains a total of 150 batches of image frames, for example, the aforementioned Step 263 is executed seven times each on portions each of 20 image frames. After the processing is completed on the seven portions, 10 image frames remain yet to be processed where the number of batches of image frames is 150 as mentioned above. In this case, the decision in Step 263 draws NO as an answer and the steps shown in FIG. 11D are executed.

As illustrated in FIG. 11D, the number J of remaining image frames is calculated in Step 270. This value J is found by deducting from the number K of the batches of image frames such a 150 in one microfilm the aforementioned value L which is the product of 7 multiplied by 20, for example. In the present case, therefore, the remaining number is found to be 10. In Step 271, the number n of image frames resulting from the addition of α to the aforementioned number J is calculated similarly to the calculation in Step 264. When this value n is found to be smaller than 5 in Step 272, the backward motion of the film at a low speed is executed in Step 273 and the routine proceeds to Step 275. When the value n is found to be larger than 5, the backward motion of the film at a medium speed is executed in Step 274 to expedite the transfer of the film. Without reference to the speed of transfer, the deduction of 1 from the number n found as described above is effected at Step 276 each time a frame mark passes the sensor 43a in Step 275. The motor MF is stopped in Step 278 when the value n is judged to be 0 in Step 277. When the answer in Step 277 is NO, the routine returns to Step 272.

Then, the film is switched to the forward motion to permit memorization of the data of distances between the frame marks of the remaining image frames. In Step 279, the question as to whether the value of n found in the aforementioned Step 271, namely the sum of J+α, is larger or smaller than 5 is decided. Depending on the result of this decision, the forward motion of the film is set at a medium speed or a low speed in Step 280 (when NO in Step 279) and Step 281 (when YES in Step 279). When the frame marks are detected in Step 282 in consequence of the forward motion of the film, the number of the frame marks so detected is counted in Step 283 and, at the same time, the distance counter is turned on in Step 284. Further by the processing in Steps 285 to Step 289, the data of distances between the frame marks are memorized. Specifically, each time a frame mark is detected in Step 285, the addition of 1 to the number of frame marks n is effected in Step 286 and the value of the distance Cn between the preceding frame mark to the present frame mark is memorized in register Lcn in Step 287 and the counter is reset in Step 289.

From Step 289, the routine proceeds to Step 290 where the value n is discerned. When n does not equal j in Step 290, the routine returns to Step 284. When the decision in Step 290 draws YES as an answer, this fact means that the last frame part of the remaining batch of image frames has reached the position of the sensor 43a. In Step 291, the transfer of the film is switched to the forward motion of a low speed. The transfer of the film is stopped in Step 293 when the fact that the transfer of the film has been completed over the value C corresponding to the stroke m of deflection between the projected light path S and the sensor 43a is discerned in Step 292. Then, the counter is reset in Step 294 and the print subroutine of Step 295 is executed.

After the production of a copy of image information from one image frame has been completed, the deduction of 1 from the aforementioned value n is effected at Step 296 and the question as to whether or not the value n resulting from the deduction is 0 is decided in Step 297. When the value of n is found to be 0 after the production of a copy from one image frame, this fact means that the remaining batch of image frames is composed of only one image frame. In this case, the decision in Step 297 draws YES as an answer and the step is returned. When there exists any image frame yet to be copied, the decision in this Step 297 draws NO as an answer and the film is moved backwardly at a low speed in Step 298. This distance of this backward motion is set on the basis of the already memorized data of distances. The processing is returned to Step 292 when the fact that this backward motion has already covered the memorized distance is discerned in Step 299.

Again in the present embodiment, it is of course possible to produce a stated plurality of copies at a time from one after another of a plurality of image frames. In this case, the flow charts shown in FIG. 11A through FIG. 11E are repeated each for as any copies as set first.

The present embodiment contemplates performing the operation of copying of the image information contained in one batch of image segments led by the image frame labeled with a batch mark in the direction from the last through the first of the plurality of image frames. This statement does not necessarily mean that the operation of copying is limited to the image information classified by the unit of batches. So long as a desired range containing a plurality of image frames selected from the whole image frames recorded on a microfilm is designated as a batch, group or block to be copied, the image information contained in the designated block, group or block of image frames can be continuously copied sequentially in the order from the last through the first of the plurality of image frames. When the image information to be copied is classified by the unit of batches as mentioned above, therefore, the image frames which form one group constitutes itself the designated batch of image frames.

The reader printer can be used of course in the ordinary manner as resorting to the steps of projecting the images recorded on the microfilm F on the screen 11 and inspecting the projected images and retrieving particular images.

The embodiments described above invariably contemplate having the sensor 43 disposed on the upstream side in the forward motion of the film F relative to the projected light path S. Optionally, the sensor 43 may be disposed on the downstream side instead. The embodiments further contemplate affixing the frame marks and the batch marks in such a manner that their edges will be aligned with the leading end side edges of the relevant image frames. Optionally, these marks may be positioned at the centers of the image frames instead. As regards the type of the microfilm F to be used in the reader printer, a film containing marks for classification of higher category than the batch marks in addition to the frame marks and the batch marks mentioned above may be used.

I claim:

1. A microfilm handling apparatus capable of discriminating among batches of image frames recorded on a microfilm, comprising:

transport means for selectively imparting a motion to said microfilm;

an image receiving plane on which an image of the image frame positioned at a predetermined location is projected;

designating means for designating a batch of image frames to be retrieved;

detecting means, disposed apart from the predetermined location, for detecting positional relationship between the image frames included in the designated batch;

memory means for storing the positional relationship detected by said detecting means; and control means for controlling said transport means based on the positional relationship stored in said memory means so that the image frames included in the designated batch are positioned at the predetermined location in a sequential order.

2. A microfilm handling apparatus according to claim 1, which further comprises copying means for copying the image frame positioned at the predetermined location on a recording paper.

3. A microfilm handling apparatus according to claim 1, wherein said designating means designates the first and the last of the image frames.

4. A microfilm handling apparatus according to claim 1, wherein said detecting means includes a sensor, disposed on the upstream side in the microfilm supplying direction relative to the predetermined location, for detecting blip marks affixed on the microfilm corresponding to the image frames.

5. A microfilm handling apparatus according to claim 4, which further comprises distance memory means for memorizing distance data which represent a distance between said sensor and predetermined location.

6. A microfilm handling apparatus according to claim 5, which further comprises means for revising the distance data memorized in said distance memory means.

7. A microfilm handling apparatus for handling a microfilm having a multiplicity of image frames recorded thereon, batch marks affixed thereon corresponding to the leading image frames of batches of image frames and frame marks affixed thereon corresponding to the image frames, the apparatus comprising;

a film transport path for guiding the microfilm across a projected light path;

copying means for copying the image frame positioned in the projected light path on a recording paper;

detecting means, disposed apart from the projected light path, for detecting the batch marks and the frame marks;

forward drive means for forwardly transporting the microfilm along the film transport path;

backward drive means for backwardly transporting the microfilm along the film transport path;

designating means for designating a batch of image frames to be retrieved;

memory means for memorizing distances between the frame marks corresponding to the image frames which are included in the designated batch from detection of the batch mark corresponding to the designated batch until detection of the next batch mark during the course of the forward motion of the microfilm; and control means for controlling said copying means and said backward drive means so that the image frames included in the designated batch are sequentially copied from the last through the first of the image frames by repeating the copying operation performed by said copying means while the backward drive means are intermittently activated after the last image frame of the designated batch is positioned in the projected light path.

8. A microfilm handling apparatus according to claim 7, which further comprises copy number setting means for setting a number of copies to be produced for each image frame and means for repeatedly activating said control means according to the number of copies set by said copy number setting means.

9. A microfilm handling apparatus according to claim 8, which further comprises means for renewing the distances memorized in said memory means during a copying operation producing a set of copies.

10. A microfilm handling apparatus according to claim 7, wherein said detecting means comprises a sensor disposed on the upstream side in the direction of the forward motion of the microfilm supplying direction relative to the projected light path.

11. A microfilm handling apparatus according to claim 10, which further comprises distance memory means for memorizing distance data which represent a distance between said sensor and projected light path.

12. A microfilm handling apparatus according to claim 11, which further comprises means for revising the distance data memorized in said distance memory means.

13. A microfilm handling apparatus for handling a microfilm having a multiplicity of image frames recorded thereon and blip marks affixed thereon corresponding to the image frames, the apparatus comprising;

a film transport path for guiding the microfilm across a projected light path;

copying means for copying the image frame positioned in the projected light path on a recording paper;

detecting means, disposed apart from the projected light path, for detecting the batch marks and the frame marks;

forward drive means for forwardly transporting the microfilm along the film transport path;

backward drive means for backwardly transporting the microfilm along the film transport path;

designating means for designating a batch of image frames to be retrieved;

memory means for dividing the designated batch of image frames into units of image frames of a predetermined number and memorizing distances between the blip marks corresponding to the image frames which are included in the unit of image frames during the course of the forward motion of the microfilm; and control means for controlling said copying means and backward drive means so that the image frames included in the unit of image frames are sequentially copied from the last through the first of the image frames.

14. A microfilm handling apparatus according to claim 13, which further comprises copy number setting means for setting a number of copies to be produced for each image frame and means for repeatedly activating said control means according to the number of copies set by said copy number setting means.

15. A microfilm handling apparatus according to claim 14, which further comprises means for renewing the distances memorized in said memory means during a copying operation producing a set of copies.

16. A microfilm handling apparatus according to claim 13, wherein said detecting means comprises a sensor disposed on the upstream side in the direction of the forward motion of the microfilm supplying direction relative to the projected light path.

17. A microfilm handling apparatus according to claim 16, which further comprises distance memory means for memorizing distance data which represent a distance between said sensor and projected light path.

18. A microfilm handling apparatus according to claim 17, which further comprises means for revising the distance data memorized in said distance memory means.

19. A method of handling a microfilm on which a plurality of image frames are recorded, the method comprising the steps of;

designating a batch of image frames to be retrieved;

detecting positional relationship between the image frame included in the batch designated at a location apart from an image projecting light path;

memorizing the positional relationship detected; and positioning the image frames one at a time in the image projecting light path sequentially from the last through the first image frames based on the positional relationship memorized.

20. A method according to claim 19, which further comprises a step of copying the image frame positioned in the image projecting light path.

21. A method of handling a microfilm on which a plurality of image frames are recorded, the method comprising the steps of;

designating a batch of image frames to be retrieved;

searching the first image frame of the batch designated;

imparting a forward motion to the microfilm after the first image frame of the batch designated is searched until the last image frame of the batch designated is searched;

detecting positional relationship between the image frames included in the batch designated at a location apart from an image projecting light path during the forward motion of the microfilm;
memorizing the positional relationship detected;
positioning the image frames one at a time in the image projecting light path sequentially from the last through the first image frames based on the positional relationship memorized; and
copying the image frame on a recording paper each time the image frame is positioned in the image projecting light path.

* * * * *

UNITED STATES PATENT AND TRADEMARK OFFICE
CERTIFICATE OF CORRECTION

PATENT NO. : 5,072,408
DATED : December 10, 1991
INVENTOR(S) : Nobuo Ueda

It is certified that error appears in the above-identified patent and that said Letters Patent is hereby corrected as shown below:

In col. 7, line 35, after "and," insert --at the same time, to copy the image information in each of--.
In col. 12, line 51, change "on" to --one--.
In col. 16, line 20, change "c" to --$\alpha$--.

Signed and Sealed this

Twentieth Day of April, 1993

Attest:

MICHAEL K. KIRK

*Attesting Officer*  *Acting Commissioner of Patents and Trademarks*